US008605020B2

(12) United States Patent
Saitoh et al.

(10) Patent No.: US 8,605,020 B2
(45) Date of Patent: Dec. 10, 2013

(54) LIQUID CRYSTAL DISPLAY DEVICE AND METHOD FOR DRIVING SAME

(75) Inventors: Masaaki Saitoh, Osaka (JP); Tomoo Furukawa, Osaka (JP); Kazuyoshi Fujioka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 276 days.

(21) Appl. No.: 12/998,665

(22) PCT Filed: Aug. 27, 2009

(86) PCT No.: PCT/JP2009/064988
§ 371 (c)(1),
(2), (4) Date: May 17, 2011

(87) PCT Pub. No.: WO2010/058644
PCT Pub. Date: May 27, 2010

(65) Prior Publication Data

US 2011/0221786 A1 Sep. 15, 2011

(30) Foreign Application Priority Data

Nov. 19, 2008 (JP) ................................ 2008-295720

(51) Int. Cl.

| | |
|---|---|
| ***G09G 3/36*** | (2006.01) |
| ***G09G 5/00*** | (2006.01) |
| ***G09G 5/10*** | (2006.01) |
| ***G09G 5/02*** | (2006.01) |
| ***G06F 3/038*** | (2013.01) |

(52) U.S. Cl.
USPC .................. 345/89; 345/87; 345/88; 345/94; 345/95; 345/690; 345/694; 345/204

(58) Field of Classification Search
USPC ................. 345/204, 690, 694, 87–89, 94, 95
See application file for complete search history.

(56) References Cited

U.S. PATENT DOCUMENTS

| | | | | |
|---|---|---|---|---|
| 5,499,126 | A * | 3/1996 | Abileah et al. ................ | 349/106 |
| 5,745,206 | A | 4/1998 | Koike et al. | |
| 5,818,615 | A | 10/1998 | Abileah et al. | |
| 6,008,786 | A | 12/1999 | Kimura et al. | |
| 6,169,590 | B1 | 1/2001 | Abileah et al. | |
| 2004/0257325 | A1 | 12/2004 | Inoue | |
| 2006/0055713 | A1 * | 3/2006 | Asao et al. .................... | 345/690 |

FOREIGN PATENT DOCUMENTS

| | | |
|---|---|---|
| EP | 0 656 560 | 6/1995 |
| JP | 61098330 A | 5/1986 |
| JP | 07199173 A | 8/1995 |

(Continued)

*Primary Examiner* — Ilana Spar
(74) *Attorney, Agent, or Firm* — Harness, Dickey & Pierce, P.L.C.

(57) ABSTRACT

A liquid crystal display device of at least one embodiment of the present invention includes a TN-mode liquid crystal display panel which is constituted by pixels of three colors (red, green, and blue) and a color filter. A thickness of a liquid crystal layer (cell thickness) is determined on a basis of a retardation value of green light or red light, which has a larger wavelength than blue having shortest wavelength among the three colors. A display data switching circuit carries out gradation conversion of shifting input gradation values to lower gradation values with respect to image data supplied to pixels of blue. Thus, grayscale inversion is prevented. The liquid crystal display device of the present invention produces an effect of improving transmittance of pixels of colors having wavelengths other than the wavelength of blue.

11 Claims, 17 Drawing Sheets

(56) References Cited

FOREIGN PATENT DOCUMENTS

| | | | |
|---|---|---|---|
| JP | 07281176 | A | 10/1995 |
| JP | 09160019 | A | 6/1997 |
| JP | 09-319334 | | 12/1997 |
| JP | 2001-281619 | | 10/2001 |
| JP | 2005010520 | A | 1/2005 |
| JP | 2007279276 | A | 10/2007 |

* cited by examiner

FIG. 6

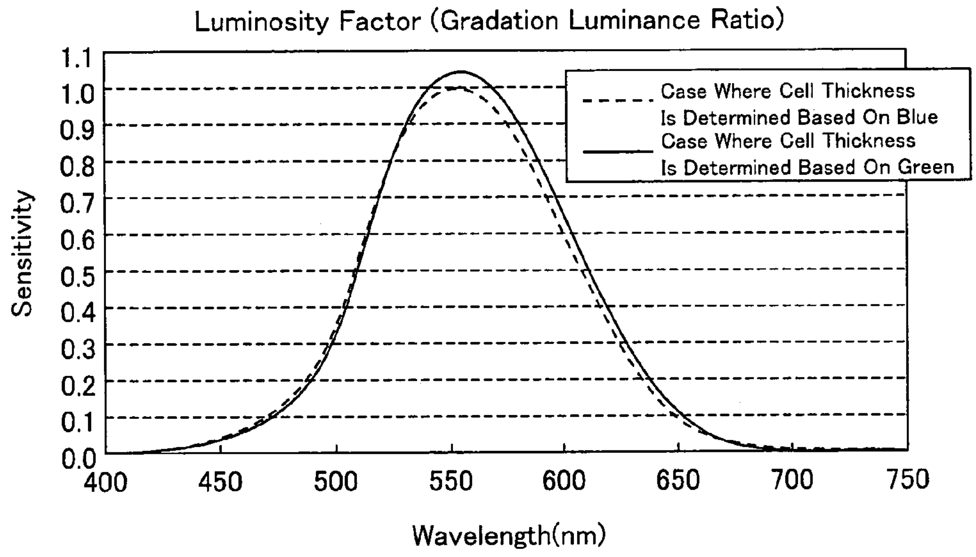

FIG. 7

| | | Conventional Art | Comparative Example | Embodiment 1 |
|---|---|---|---|---|
| Cell Thickness (μm) | | 3.1 | 3.8 | 3.8 |
| Color Which Retardation Is Based On | | Blue | Green | Green |
| Gradation Conversion By Using Different γ | | No | No | Yes |
| Actual Measurement Value Of Transmittance | | 4.43% | 4.92% | 5.01% |
| Transmittance Ratio | White | 1 (ref) | 1.11 | 1.13 |
| | Blue | 1 (ref) | 0.94 | 0.97 |
| | Green | 1 (ref) | 1.20 | 1.20 |
| | Red | 1 (ref) | 1.14 | 1.14 |
| Grayscale Inversion | Blue | ○ (Not Occur) | × (Occur) | ○ (Not Occur) |
| | Green | ○ (Not Occur) | ○ (Not Occur) | ○ (Not Occur) |
| | Red | ○ (Not Occur) | ○ (Not Occur) | ○ (Not Occur) |

| | | Conventional Art | Comparative Example | Embodiment 2 |
|---|---|---|---|---|
| Cell Thickness (μm) | | 3.1 | 4.2 | 4.2 |
| Color Which Retardation Is Based On | | Blue | Red | Red |
| Actual Measurement Value Of Transmittance | | 4.43% | 4.74% | 4.83% |
| Transmittance Ratio | White | 1 (ref) | 1.07 | 1.09 |
| | Blue | 1 (ref) | 0.91 | 0.95 |
| | Green | 1 (ref) | 1.12 | 1.14 |
| | Red | 1 (ref) | 1.19 | 1.19 |
| Grayscale Inversion | Blue | ○ (Not Occur) | × (Occur) | ○ (Not Occur) |
| | Green | ○ (Not Occur) | ○ (Not Occur) | ○ (Not Occur) |
| | Red | ○ (Not Occur) | ○ (Not Occur) | ○ (Not Occur) |

| | | Conventional Art | Comparative Example | Embodiment 3 |
|---|---|---|---|---|
| Cell Thickness (μm) | | 3.1 | 4.4 | 4.4 |
| Color Which Retardation Is Based On | | Blue | λ >Red | λ >Red |
| Actual Measurement Value Of Transmittance | | 4.43% | 4.62% | 4.66% |
| Transmittance Ratio | White | 1 (ref) | 1.04 | 1.05 |
| | Blue | 1 (ref) | 0.89 | 0.93 |
| | Green | 1 (ref) | 1.02 | 1.12 |
| | Red | 1 (ref) | 1.17 | 1.18 |
| Grayscale Inversion | Blue | ○ (Not Occur) | × (Occur) | ○ (Not Occur) |
| | Green | ○ (Not Occur) | × (Occur) | ○ (Not Occur) |
| | Red | ○ (Not Occur) | △ (Moderately Occur) | ○ (Not Occur) |

| | Luminance Ratios Of Different CF Colors | | | | | (Luminance) Transmittance Ratio |
|---|---|---|---|---|---|---|
| | R | G | B | | W | |
| B Optimum | 1.8 | 6.7 | 1.0 | → | 9.6 | 100% |
| G Optimum | 2.0 | 7.0 | 1.0 | → | 10.0 | 104% |
| R Optimum | 2.0 | 6.9 | 0.9 | → | 9.8 | 102% |
| λ =670nm Optimum | 2.0 | 6.8 | 0.9 | → | 9.7 | 101% |

↓ Digital γ Processing

| | Luminance Ratios Of Different CF Colors | | | | | (Luminance) Transmittance Ratio |
|---|---|---|---|---|---|---|
| | R | G | B | | W | |
| B Optimum | 1.8 | 6.7 | 1.0 | → | 9.6 | 100% |
| G Optimum (Embodiment 1) | 2.0 | 7.0 | 1.0 | → | 10.0 | 104% |
| R Optimum (Embodiment 2) | 2.0 | 6.9 | 1.0 | → | 9.9 | 103% |
| λ =670nm Optimum (Embodiment 3) | 2.0 | 6.8 | 0.9 | → | 9.7 | 102% |

LIQUID CRYSTAL DISPLAY DEVICE AND METHOD FOR DRIVING SAME

TECHNICAL FIELD

The present invention relates to a liquid crystal display device which displays a color image with the use of color filters of plural colors and a method for driving the liquid crystal display device.

BACKGROUND ART

Liquid crystal display devices are flat display devices which have excellent features such as high definition, low profile, light weight, and low power consumption. In recent years, a market scale of liquid crystal display devices has been rapidly increasing due to improved display performance, increased production capacity, and improved price competitiveness against other display devices.

In a twisted nematic mode (TN mode) liquid crystal display device which is widely used today, long axes of liquid crystal molecules having positive dielectric anisotropy are aligned substantially parallel to a substrate surface, and the long axes of the liquid crystal molecules are twisted by substantially 90° between upper and lower substrates along a thickness direction of a liquid crystal layer. When a voltage is applied to the liquid crystal layer, the liquid crystal molecules are aligned parallel to an electric field, and twist alignment is eliminated. In a TN mode liquid crystal display device, light transmittance is controlled by utilizing a change in optical rotation caused by a change in alignment of liquid crystal molecules which occurs due to voltage application.

In designing a panel of such a liquid crystal display device, it is necessary that retardation of light be a desired value in order to realize as high transmittance as possible.

Here, a retardation value u is determined by the following equation:

$$u=2\Delta nd/\lambda$$

where Δn is refractive index anisotropy (birefringence) of a liquid crystal material, d is a cell thickness, and λ is a wavelength of light. According to the equation, the thickness (also referred to as cell thickness) of a liquid crystal layer of a liquid crystal display panel is determined based on the refractive index anisotropy Δn which is determined based on the type of the liquid crystal material, the wavelength λ of light used as a standard, and the retardation value u for obtaining the desired transmittance.

Generally, in a TN mode liquid crystal display device which displays a color image of mixed colors of R, G, and B, a cell thickness of a liquid crystal panel is determined on the basis of retardation which is based on the wavelength of blue light, which has the shortest wavelength among the three colors (red (R), green (G), and blue (B)) of color filters (see Patent Literature 1, for example).

CITATION LIST

Patent Literature 1

Japanese Patent Application Publication, Tokukaisho, No. 61-98330 A (Publication Date: May 16, 1986)

SUMMARY OF INVENTION

Technical Problem

However, in a case where a cell thickness is determined on the basis of the wavelength of blue light which is the shortest wavelength as above, there occurs a problem that sufficient transmittance cannot be obtained in pixels of green and red which have longer wavelength than blue light.

FIG. 24 shows how transmittance of a liquid crystal display panel changes depending on a wavelength in a case where a cell thickness is determined in accordance with a current method for determining the cell thickness of a liquid crystal display panel such that a retardation value becomes optimum at the wavelength of blue which is the shortest wavelength. As shown in FIG. 24, transmittance of blue pixels has an optimum value (1 in this case) since a cell thickness of a current liquid crystal display panel is designed so that retardation becomes optimum at the wavelength of blue. Meanwhile, transmittance of green and red pixels is lower than the optimum value.

For example, Patent Literature 1 discloses that in a case where refractive index anisotropy Δn of a liquid crystal material is 0.18 and where a thickness (cell thickness) of a liquid crystal layer is 7 mm, a blue pixel has transmittance of 100%, whereas a green pixel and a red pixel have reduced transmittance of 98% and 88%, respectively.

In the multi-color liquid crystal display device disclosed in Patent Literature 1, transmittance of pixels having colors other than blue is improved by causing a liquid crystal layer to have different thicknesses above blue, green, and red pixels. However, the technique disclosed in Patent Literature 1 of changing a cell thickness depending on a pixel color complicates a panel manufacturing process. Moreover, there is a problem that even a slight misalignment between an active matrix substrate and a counter substrate causes cell thicknesses for the respective colors to be different from optimum values.

The present invention was attained in view of the above problems, and an object of the present invention is to provide a color liquid crystal display device in which transmittance of pixels having colors whose wavelengths are not the shortest one is improved without changing a pixel structure depending on color.

Solution to Problem

In order to attain the above object, a liquid crystal display device includes a liquid crystal display panel which has pixels of different colors and which displays a color image with use of the pixels, the liquid crystal display panel including two substrates and a liquid crystal layer sandwiched between the two substrates, and the liquid crystal layer having a thickness that is determined on a basis of a retardation value which is based on light which has a wavelength larger than light having shortest wavelength among light of the different colors.

In general, a thickness (also referred to as cell thickness) is determined based on birefringence Δn which is determined based on the type of a liquid crystal material, a wavelength λ of light used as a standard, and a retardation value u for obtaining desired transmittance. That is, the cell thickness is determined on the basis of light having a specific wavelength so that desired transmittance can be obtained in a liquid crystal display device. In a conventional color liquid crystal display device which displays a color image with use of pixels of difference colors, a cell thickness is determined on the basis of light of a color having the shortest wavelength among the different colors so that optimum transmittance can be obtained in pixels of the color having the shortest wavelength. For example, in a case where the liquid crystal display device has pixels of red, green, and blue, the cell thickness is determined on the basis of a retardation value which is based on a wavelength of blue light so that optimum transmittance can be obtained in blue pixels. However, according to this cell thickness determining method, sufficient transmittance cannot be obtained in pixels (e.g., red pixels and green pixels) of colors having wavelengths other than the shortest wavelength.

In view of this, in the present invention, a cell thickness is determined on the basis of a retardation value which is based on light having a larger wavelength than light having the shortest wavelength among light having colors of pixels.

According to the arrangement, transmittance can be improved in pixels of colors having wavelengths other than the shortest wavelength.

For example, in a liquid crystal display device which displays a multi-color image in a mixture color of red (R), green (G), and blue (B), a transmittance ratio among R, G, and B of a color filter (specifically, a luminance ratio among R, G, and B of the color filter illuminated by a white light source) is (1.3 to 2.0):(3.0 to 7.0):1 in a case where blue is used as a standard. That is, green and red, each of which has a longer wavelength than blue, make higher contribution to transmittance obtained in a case where R, G, and B are mixed, as compared to blue.

Overall transmittance obtained by multiplying transmittance of R, G, and B can be made higher in a case where a cell thickness is determined on the basis of green or red each of which has a longer wavelength than blue, as compared with a case where a cell thickness is determined on the basis of blue having the shortest wavelength. A right end column of FIG. 23 shows a ratio of (i) transmittance obtained in a case where a cell thickness is determined on the basis of B (B optimum), (ii) transmittance obtained in a case where a cell thickness is determined on the basis of G (G optimum), and (iii) transmittance obtained in a case where a cell thickness is determined on the basis of R (R optimum). In FIG. 23, the transmittance obtained in a case where the cell thickness is determined on the basis of B (B optimum) is set to 100%. Note that the upper table of FIG. 23 shows values obtained in a case where no digital γ processing is carried out (i.e., case where only the process of changing a cell thickness is carried out), and the lower table of FIG. 23 shows values obtained in a case where the digital γ processing is carried out.

According to the arrangement, transmittance of a displayed image can be improved, but there occurs a problem that grayscale inversion occurs in image data supplied to pixels of a color having a shorter wavelength than a wavelength based on which the cell thickness is determined. The grayscale inversion is a phenomenon by which transmittance of an image obtained by a low gradation value is made higher than transmittance of an image obtained by a high gradation value.

In view of this, the liquid crystal display device of the present invention is preferably arranged to further include a gradation conversion section that carries out gradation value shifting processing of shifting input gradation values to lower gradation values with respect to image data supplied to pixels having a color which has a shorter wavelength than the wavelength based on which the thickness of the liquid crystal layer is determined.

According to the arrangement, the liquid crystal display device includes a gradation conversion section that carries out gradation value shifting processing of shifting input gradation values to lower gradation values with respect to image data supplied to pixels having a color which has a shorter wavelength than the wavelength based on which the thickness of the liquid crystal layer is determined. This makes it possible to prevent grayscale inversion in the pixels having the color which has the shorter wavelength, thereby allowing an improvement in quality of a displayed image.

It is preferable that the gradation value shifting processing is processing for shifting the highest gradation value to a gradation value that is lower than the highest gradation value by 1 so that the gradation value at which grayscale inversion occurs is not used.

The liquid crystal display device of the present invention is preferably arranged such that the gradation value shifting processing varies depending on the color of the pixels.

In a case where the grayscale inversion occurs, the lowest gradation value in a high gradation region in which grayscale inversion occurs varies depending on a color of image data.

According to the arrangement, in which the gradation value shifting processing varies depending on the color of the pixels, it is possible to carry out desirable gradation conversion processing with respect to each of the image data of different colors.

Carrying out gradation value shifting processing which varies depending on the color of the pixels means that even if the image data of the different colors have the same target gradation (same input gradation), output gradation is caused to vary depending on the color so that a gradation voltage which varies depending on the color is supplied to a pixel electrode. Further, in a case where the gradation value shifting processing is carried out with reference to look-up tables, carrying out gradation value shifting processing which varies depending on the color of the pixels means that the gradation value shifting processing is carried out with reference to look-up tables which are different from one color to another.

The liquid crystal display device of the present invention is preferably arranged to further include a pseudo multi-gradation section which carries out pseudo multi-gradation processing with respect to the image data that has been subjected to the gradation value shifting processing in the gradation conversion section.

According to the arrangement, by carrying out the pseudo multi-gradation processing with respect to the image data that has been subjected to the gradation value shifting processing, it is possible to suppress a reduction in gradation expressing capability caused by a reduction in the number of available gradations.

The liquid crystal display device of the present invention is preferably arranged such that the gradation conversion section has a look-up table in which input gradation values are associated with output gradation values.

According to the arrangement, the gradation conversion processing can be carried out with reference to the look-up table. This makes it possible to more easily carry out the conversion processing and to simplify configurations of circuits etc. necessary for the data conversion processing.

The liquid crystal display device of the present invention may be arranged such that the liquid crystal display panel is constituted by pixels of blue, green, and red, and the thickness of the liquid crystal layer is determined on a basis of a retardation value which is based on a wavelength of green light or red light.

According to the arrangement, a cell thickness is determined on the basis of a retardation value which is based on the wavelength of green or red each of which has a longer wavelength than blue among the three colors of the pixels. Accordingly, the cell thickness can be determined so that transmittance becomes optimum for image data having the selected color.

The liquid crystal display device may be arranged such that the liquid crystal display panel is constituted by pixels of blue, green, and red, and the thickness of the liquid crystal layer is determined on a basis of a retardation value which is based on a wavelength of green light.

Human eyes have high sensitivity to green light, and therefore tend to feel higher brightness as transmittance of green pixels becomes higher.

According to the arrangement, the thickness of the liquid crystal layer is determined so that transmittance becomes optimum in the green pixels. Accordingly, it is possible to display an image which allows human eyes to feel higher brightness.

The liquid crystal display device of the present invention may be arranged such that the liquid crystal display panel is constituted by pixels of blue, green, and red, and the thickness of the liquid crystal layer is determined on a basis of a retardation value which is based on a wavelength of red light or a wavelength that is longer than the wavelength of the red light.

According to the arrangement, the cell thickness can be made larger as compared with the case where the cell thickness is determined on the basis of blue or green light. The thinner the cell thickness becomes, the more remarkable deterioration in quality caused by mixing in of dust etc. becomes. In a case where the cell thickness is determined on a basis of a wavelength of red light or a wavelength that is longer than the wavelength of the red light, the cell thickness can be made as large as 4.0 μm to 4.5 μm, which is larger as compared with the case where the cell thickness is determined on the basis of blue light. Accordingly, it is possible to suppress deterioration in panel quality caused by mixing in of dust etc.

In order to attain the above object, a method for driving a liquid crystal display device including a liquid crystal display panel which has pixels of different colors and which displays a color image with use of the pixels, the liquid crystal display panel including two substrates and a liquid crystal layer sandwiched between the two substrates, includes the steps of: (a) determining a thickness of the liquid crystal layer on a basis of a retardation value which is based on light which has a wavelength larger than light having shortest wavelength among light of the different colors; and (b) carrying out gradation value shifting processing of shifting input gradation values to lower gradation values with respect to image data supplied to pixels having a color which has a shorter wavelength than the wavelength based on which the thickness of the liquid crystal layer is determined.

According to the method, the cell thickness is determined on a basis of a retardation value which is based on a wavelength of light which has a larger wavelength than light having shortest wavelength among light of the different colors. Accordingly, transmittance can be improved in pixels of colors having wavelengths other than the shortest wavelength.

According to the method, gradation value shifting processing of shifting input gradation values to lower gradation values is carried out with respect to image data supplied to pixels having a color which has a shorter wavelength than the wavelength based on which the cell thickness is determined. This makes it possible to prevent grayscale inversion in the pixels having the color which has the shorter wavelength, thereby allowing an improvement in quality of a displayed image.

In the method of the present invention, it is preferable that the gradation value shifting processing carried out in the step (b) varies depending on the color of the pixels.

In a case where the grayscale inversion occurs, the lowest gradation value in a high gradation region in which grayscale inversion occurs varies depending on a color of image data.

According to the method, in which the gradation value shifting processing varies depending on the color of the pixels, it is possible to carry out desirable gradation conversion processing with respect to each of the image data of different colors.

The method of the present invention preferably includes the step of (c) carrying out pseudo multi-gradation processing with respect to the image data that has been subjected to the gradation value shifting processing.

According to the method, by carrying out the pseudo multi-gradation processing with respect to the image data that has been subjected to the gradation value shifting processing, it is possible to suppress a reduction in gradation expressing capability caused by a reduction in the number of available gradations.

In the method of the present invention, it is preferable that in the step (b), the gradation value shifting processing is carried out with reference to a look-up table in which the input gradation values are associated with output gradation values.

According to the method, the gradation conversion processing can be carried out with reference to the look-up table. This makes it possible to more easily carry out the conversion processing and to simplify configurations of circuits etc. necessary for the data conversion processing.

Advantageous Effects of Invention

According to the liquid crystal display device of the present invention, the liquid crystal display device includes two substrates and a liquid crystal layer sandwiched between the two substrates, and the thickness of the liquid crystal layer is determined on the basis of a retardation value which is based on light having a wavelength larger than light having the shortest wavelength among light of the different colors.

According to the arrangement, transmittance can be improved in pixels of colors having wavelengths other than the shortest wavelength.

The method for driving a liquid crystal display device includes the steps of: (a) determining a thickness of the liquid crystal layer on a basis of a retardation value which is based on light which has a wavelength larger than light having shortest wavelength among light of the different colors; and (b) carrying out gradation value shifting processing of shifting input gradation values to lower gradation values with respect to image data supplied to pixels having a color which has a shorter wavelength than the wavelength based on which the thickness of the liquid crystal layer is determined.

According to the method, the cell thickness is determined on a basis of a retardation value which is based on light which has a wavelength larger than light having shortest wavelength among light of the different colors. Accordingly, transmittance can be improved in pixels of colors having wavelengths other than the shortest wavelength.

Further, according to the method, it is possible to prevent grayscale inversion in the pixels having the color which has the shorter wavelength than the wavelength based on which the cell thickness is determined, thereby allowing an improvement in quality of a displayed image.

Figure 1:
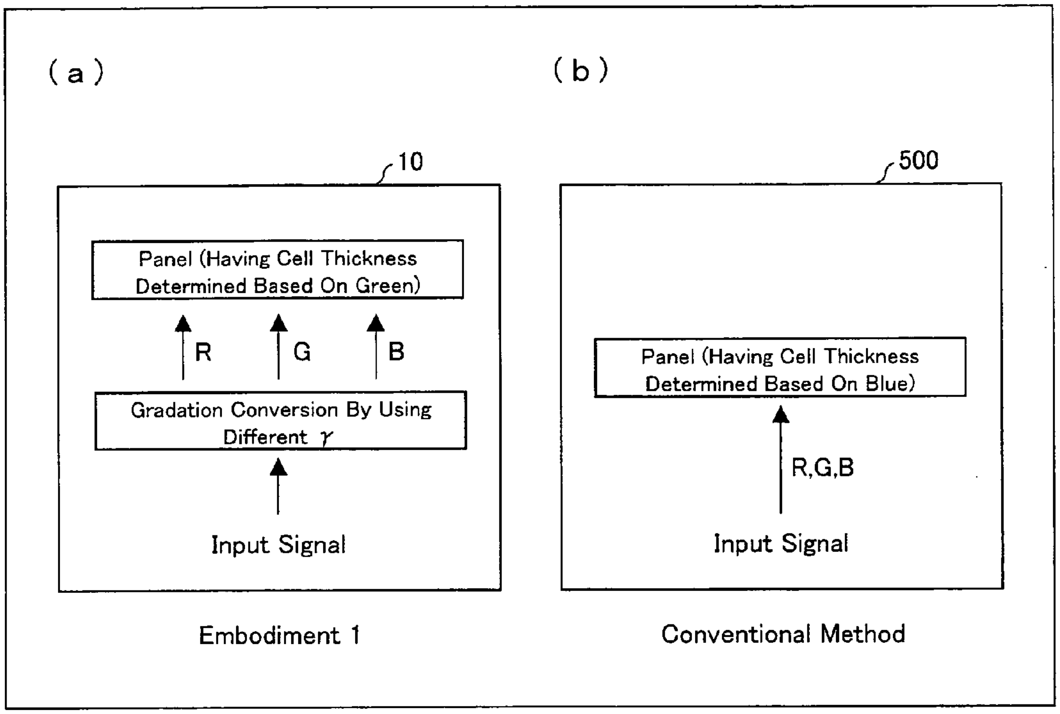
FIG. 1

(a) of FIG. 1 is a schematic view explaining display driving carried out in a liquid crystal display device of Embodiment 1 of the present invention, and (b) of FIG. 1 is a schematic view explaining display driving carried out in a conventional liquid crystal display device.

Figure 2:
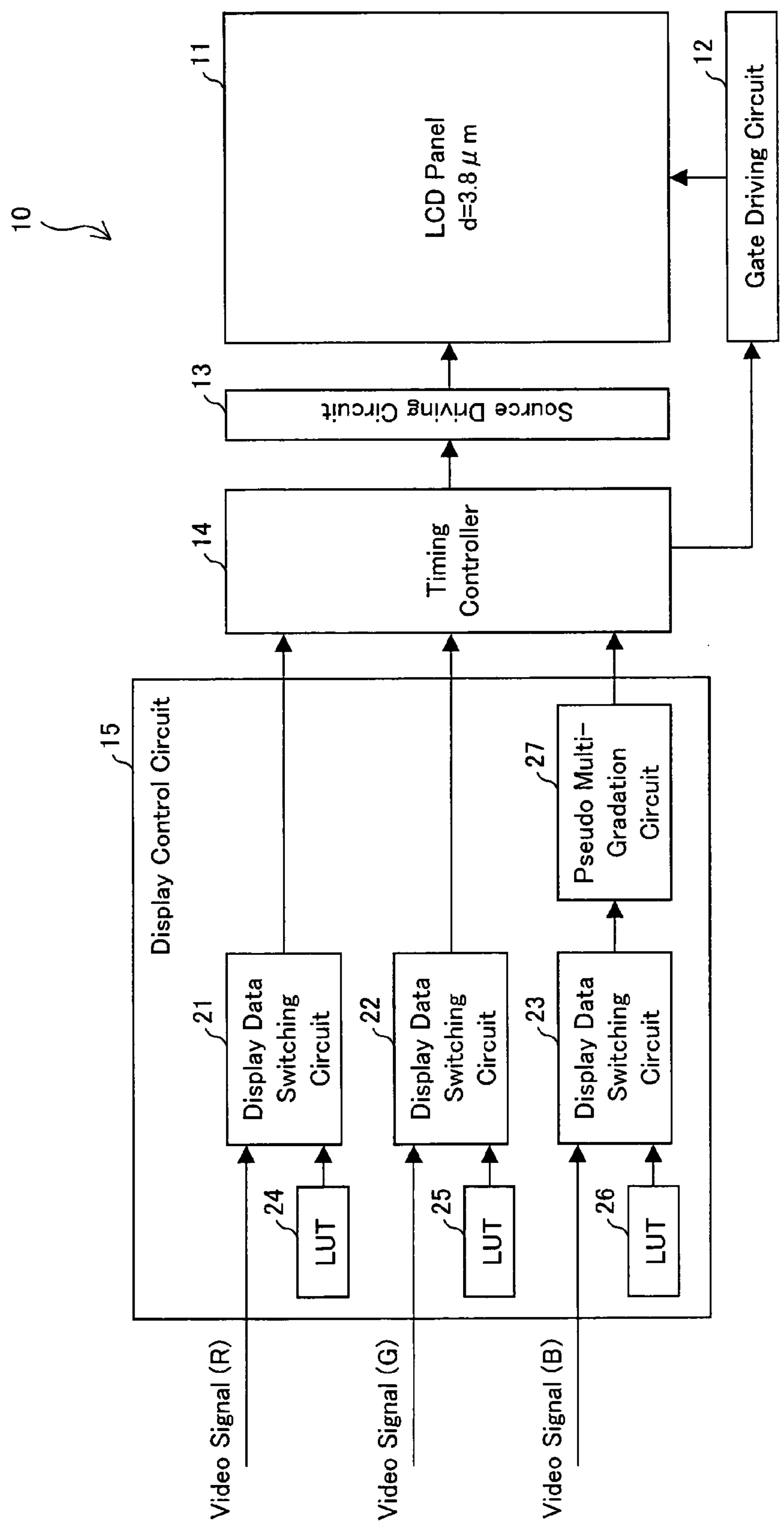

FIG. 2 is a block diagram illustrating a configuration of the liquid crystal display device of Embodiment 1 of the present invention.

Figure 3:
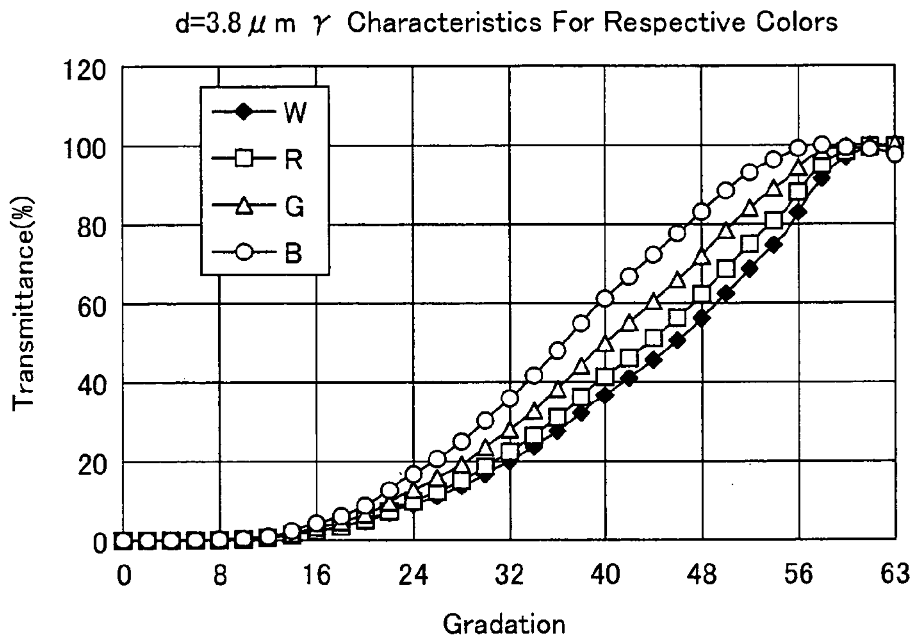

FIG. 3 is a graph showing γ characteristics of pixels of respective colors that are obtained in a case where grayscale inversion occurs.

Figure 4:
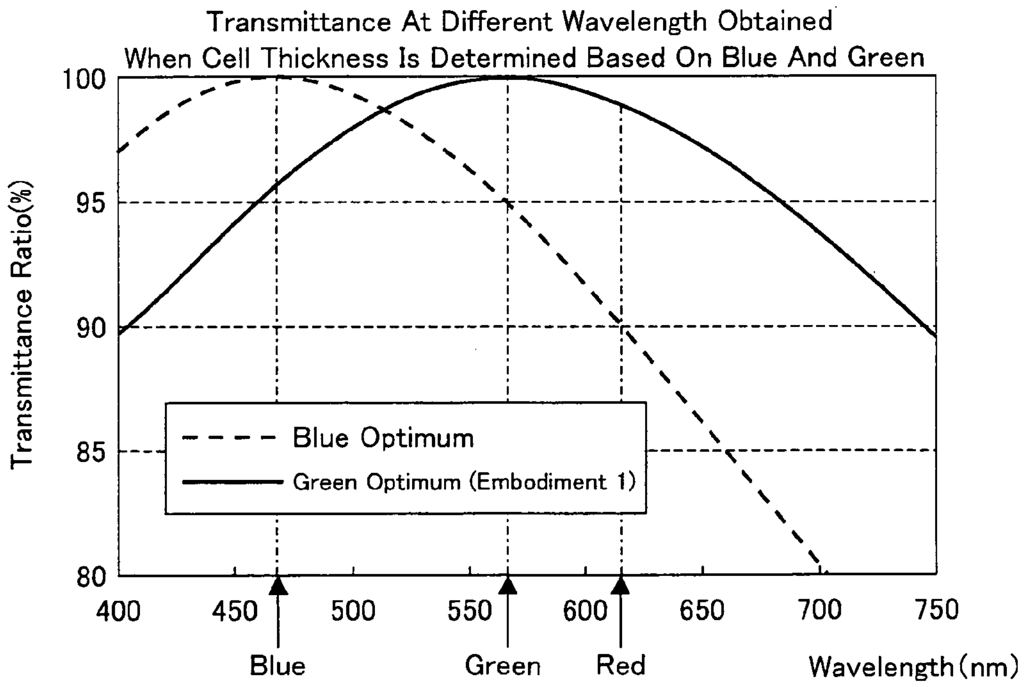

FIG. 4 is a graph showing how transmittance changes depending on a wavelength in the liquid crystal display device of Embodiment 1 of the present invention. The graph also shows, for comparison, how transmittance changes depending on a wavelength in a conventional liquid crystal display panel (the broken line).

Figure 5:
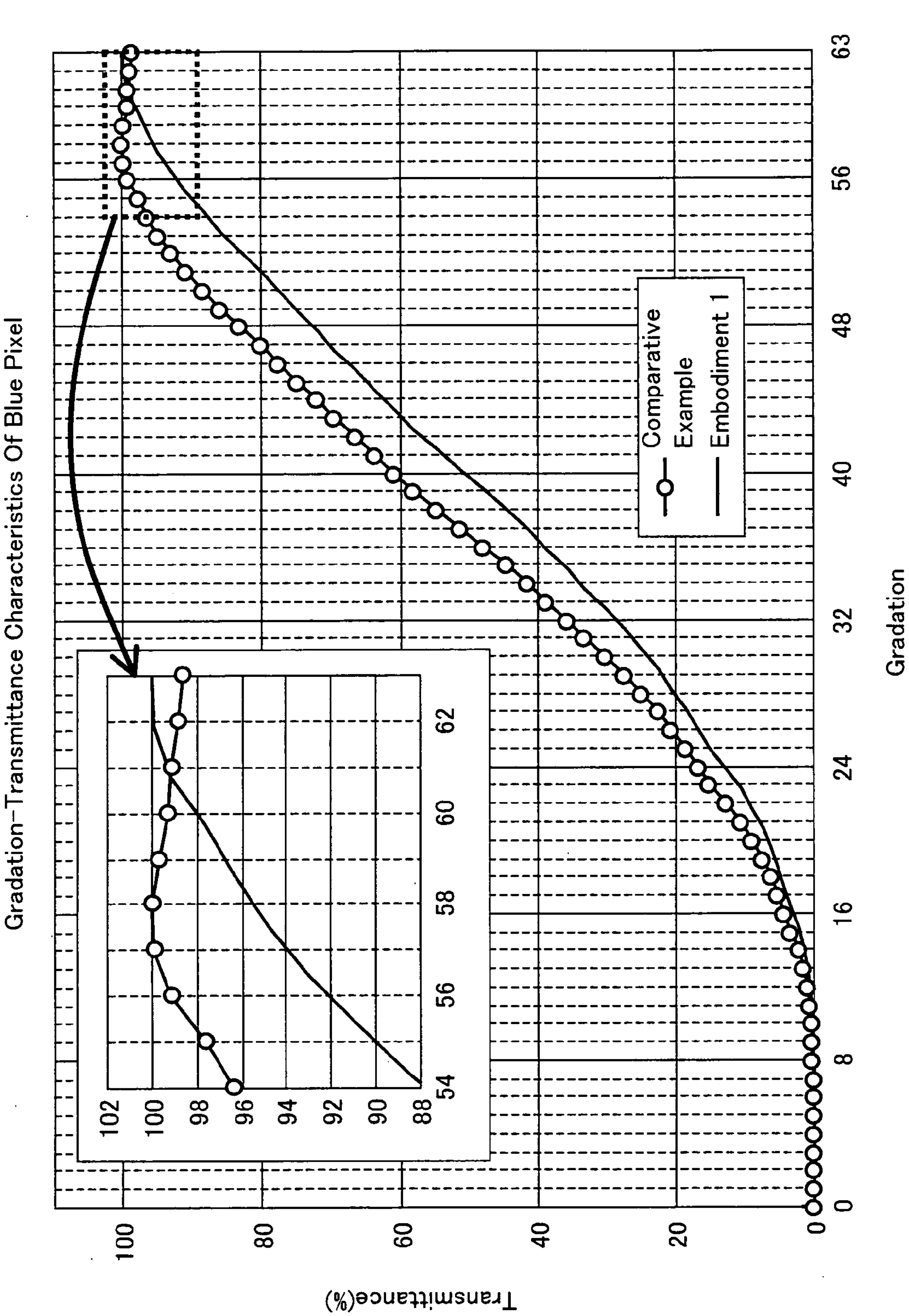

FIG. 5 is a graph showing a relationship between a gradation value of blue image data and transmittance (gradation-transmittance characteristics) in the liquid crystal display device of Embodiment 1 of the present invention.

FIG. 6 is a graph showing relationships between a wavelength of light and a luminosity factor in a liquid crystal display panel of Embodiment 1 of the present invention and in a conventional liquid crystal display panel.

FIG. 7 is a table showing a result of evaluation of panel properties in the liquid crystal display device of Embodiment 1 of the present invention and in a conventional liquid crystal display device.

Figure 8:
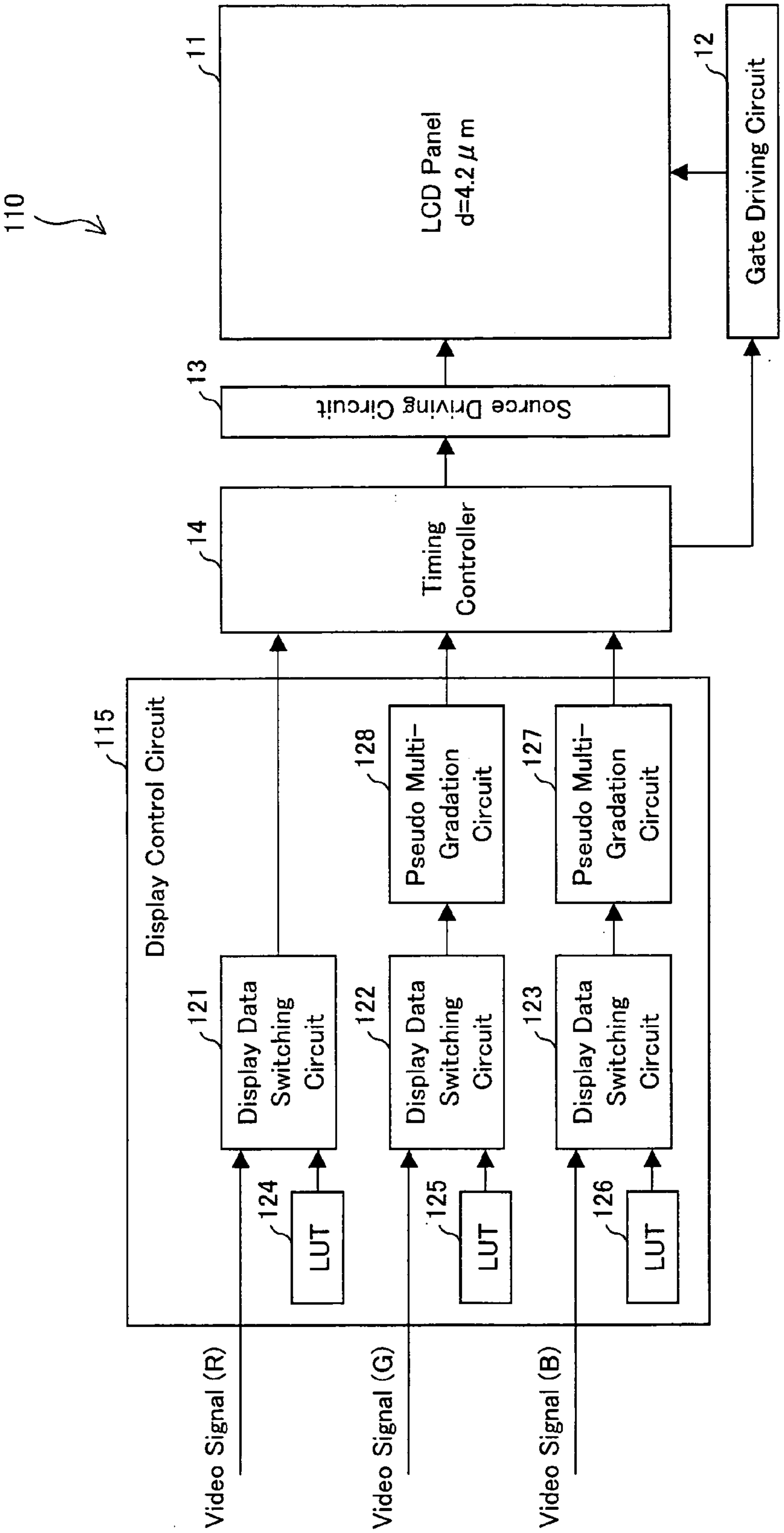

FIG. 8 is a block diagram illustrating a configuration of a liquid crystal display device of Embodiment 2 of the present invention.

Figure 9:
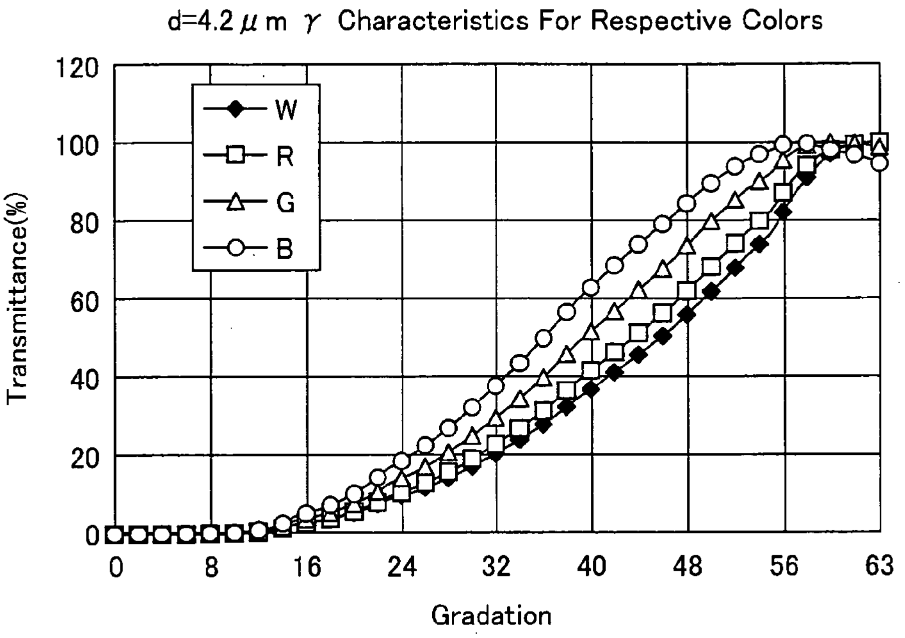

FIG. 9 is a graph showing γ characteristics of pixels of respective colors that are obtained in a case where grayscale inversion occurs.

Figure 10:
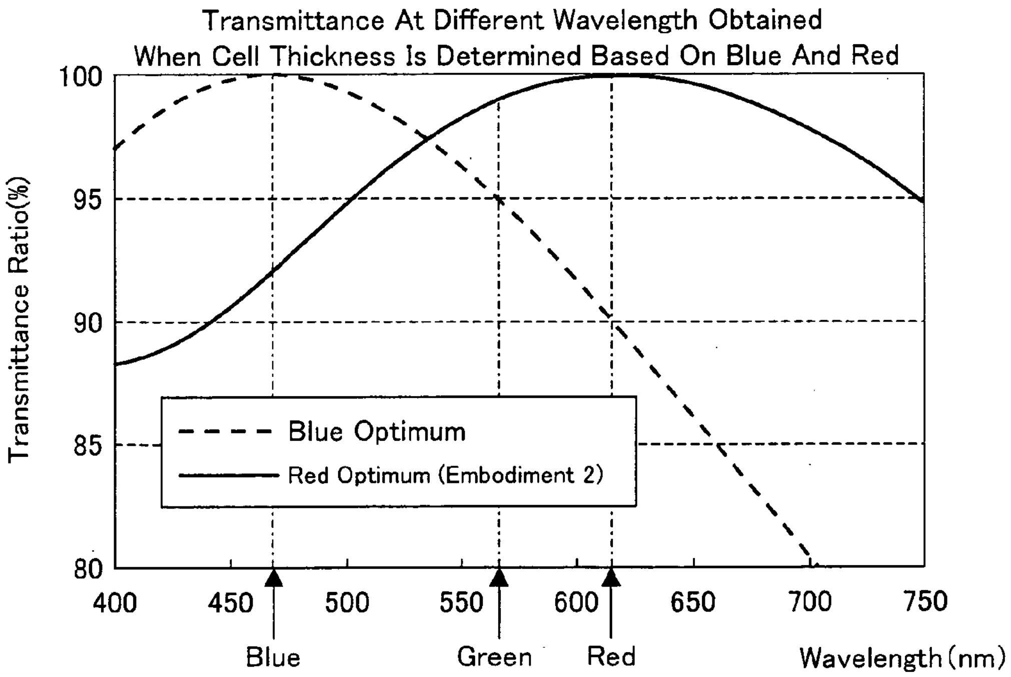

FIG. 10 is a graph showing how transmittance changes depending on a wavelength in the liquid crystal display device of Embodiment 2 of the present invention. The graph also shows, for comparison, how transmittance changes depending on a wavelength in a conventional liquid crystal display panel (the broken line).

Figure 11:
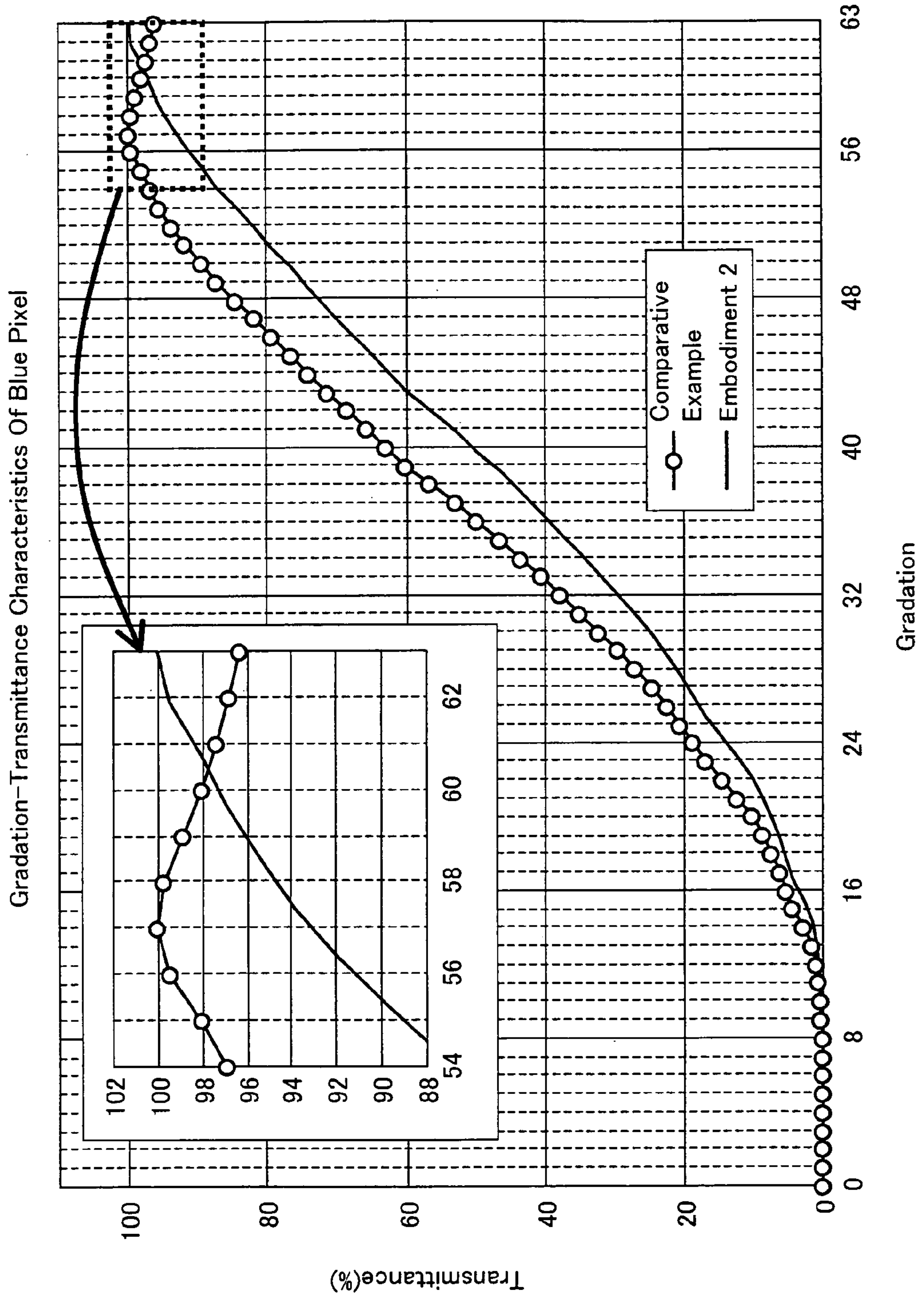

FIG. 11 is a graph showing a relationship between a gradation value of blue image data and transmittance (gradation-transmittance characteristics) in the liquid crystal display device of Embodiment 2 of the present invention.

Figure 12:
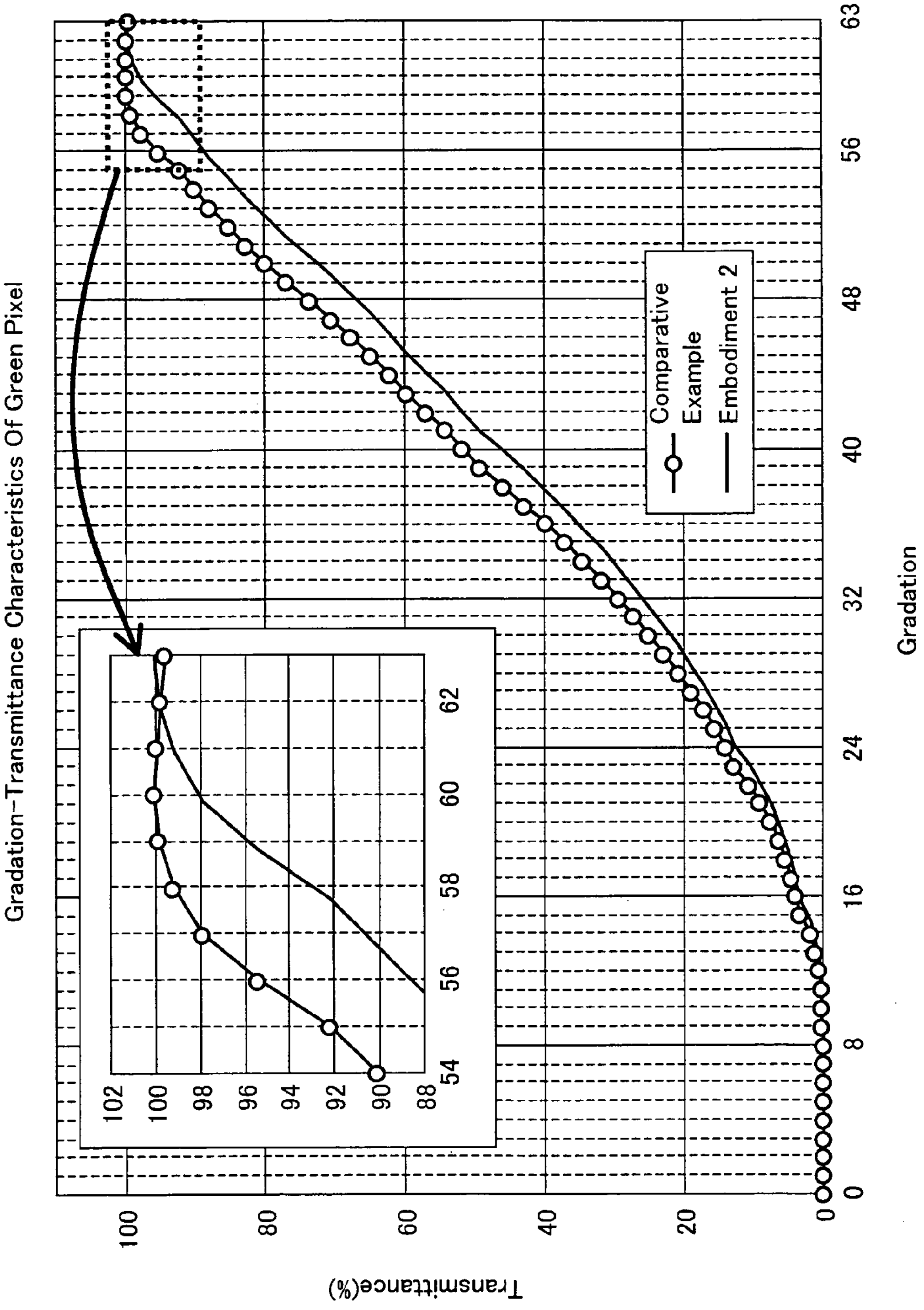

FIG. 12 is a graph showing a relationship between a gradation value of green image data and transmittance (gradation-transmittance characteristics) in the liquid crystal display device of Embodiment 2 of the present invention.

Figures 13, 14:
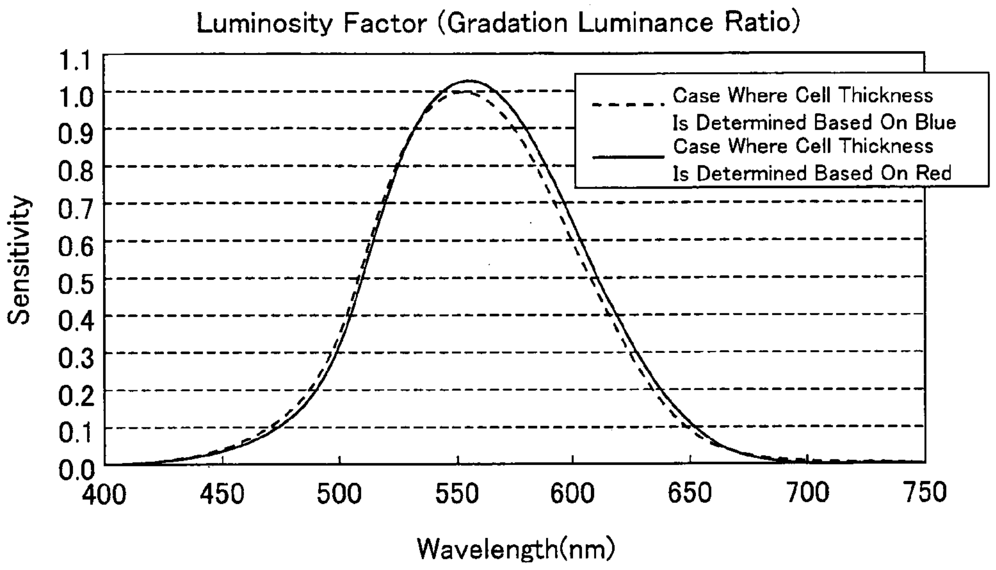

FIG. 13 is a graph showing relationships between a wavelength of light and a luminosity factor in a liquid crystal display panel of Embodiment 2 of the present invention and in a conventional liquid crystal display panel.

FIG. 14 is a table showing a result of evaluation of panel properties in the liquid crystal display device of Embodiment 2 of the present invention and in a conventional liquid crystal display device.

Figure 15:
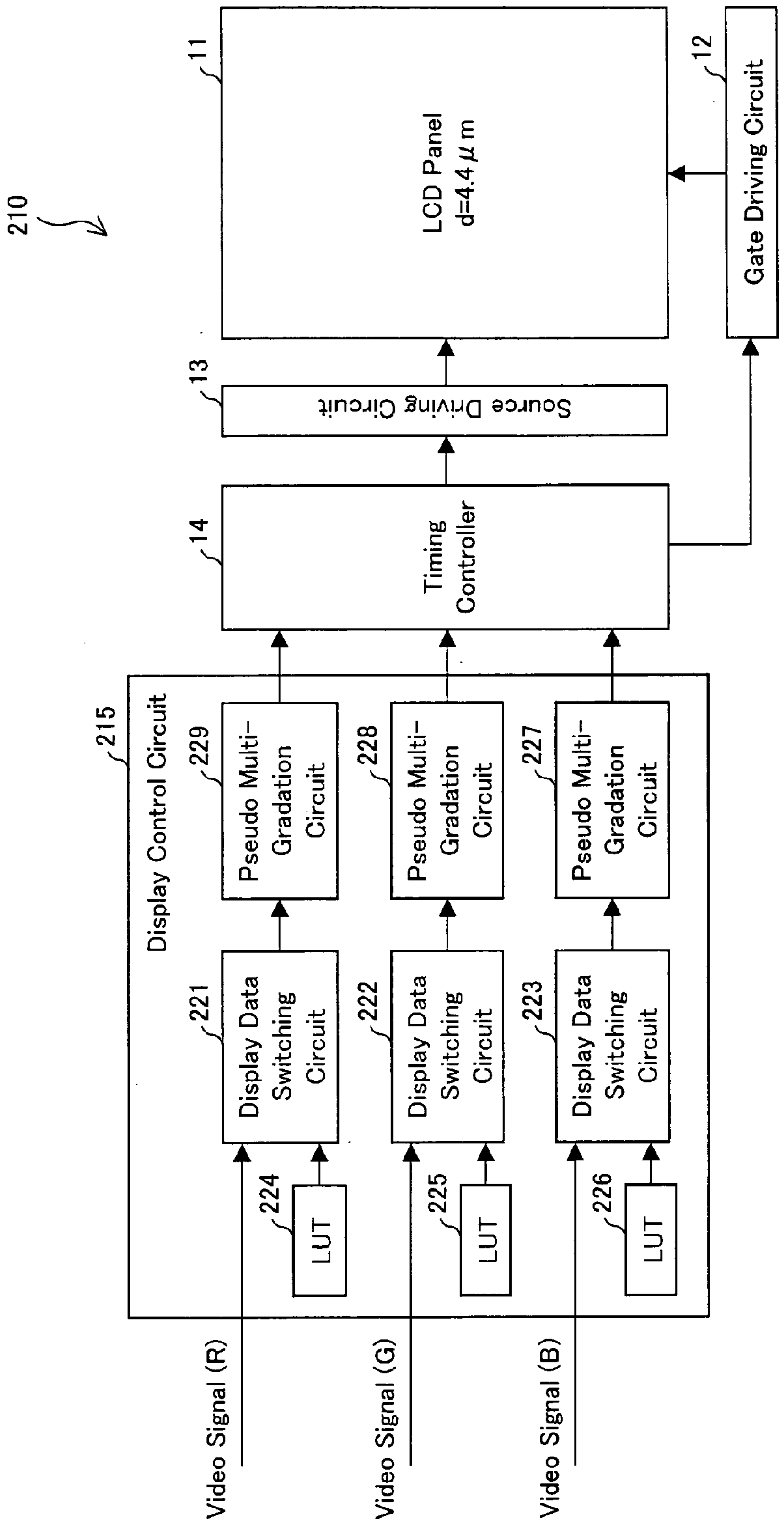

FIG. 15 is a block diagram illustrating a configuration of a liquid crystal display device of Embodiment 3 of the present invention.

Figure 16:
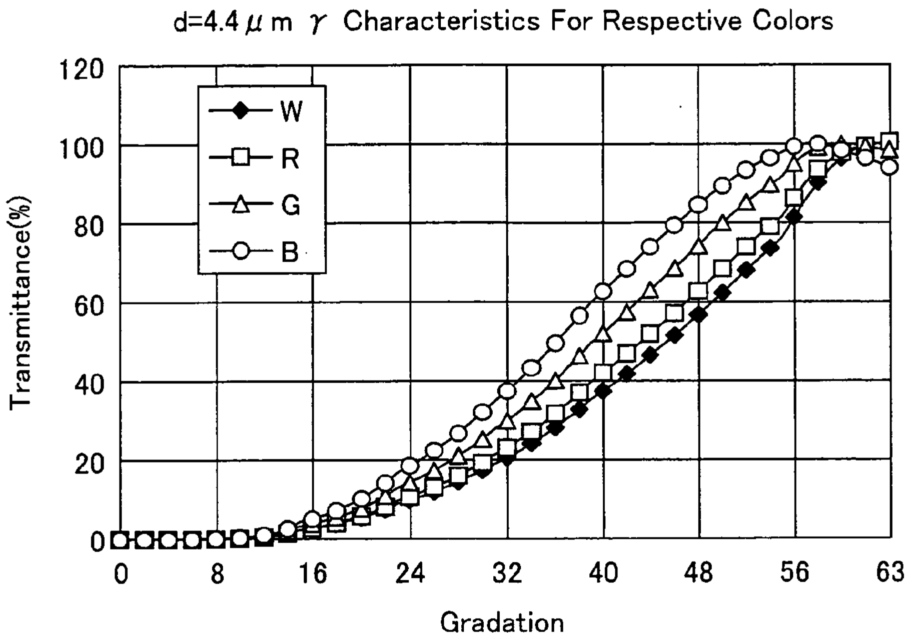

FIG. 16 is a graph showing γ characteristics of pixels of respective colors that are obtained in a case where grayscale inversion occurs.

Figure 17:
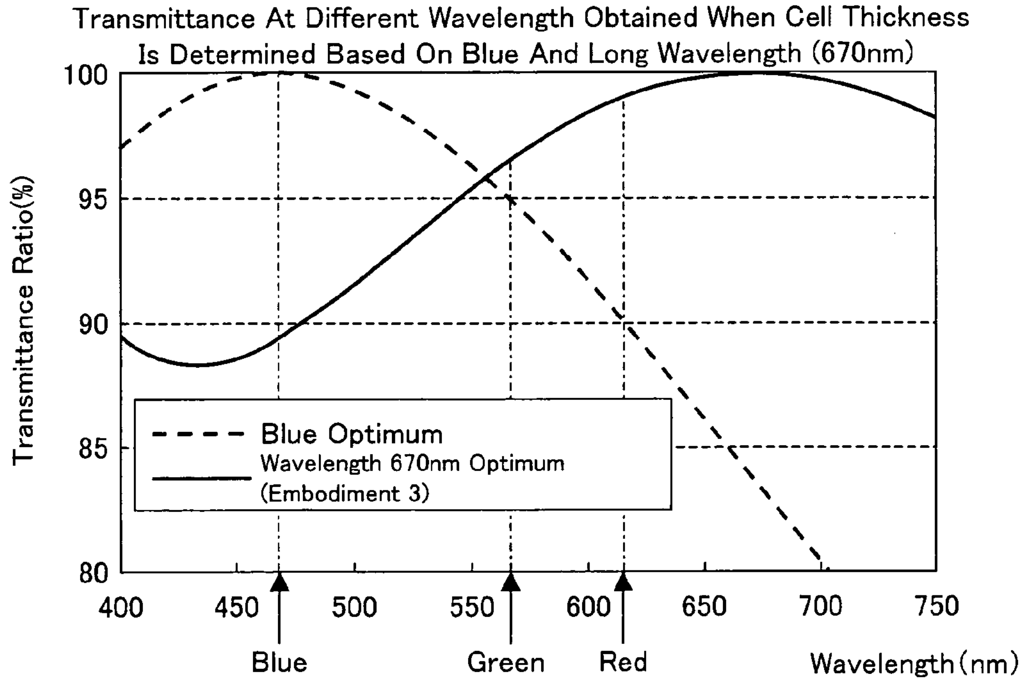

FIG. 17 is a graph showing how transmittance changes depending on a wavelength in the liquid crystal display device of Embodiment 3 of the present invention. The graph also shows, for comparison, how transmittance changes depending on a wavelength in a conventional liquid crystal display panel (the broken line).

Figure 18:
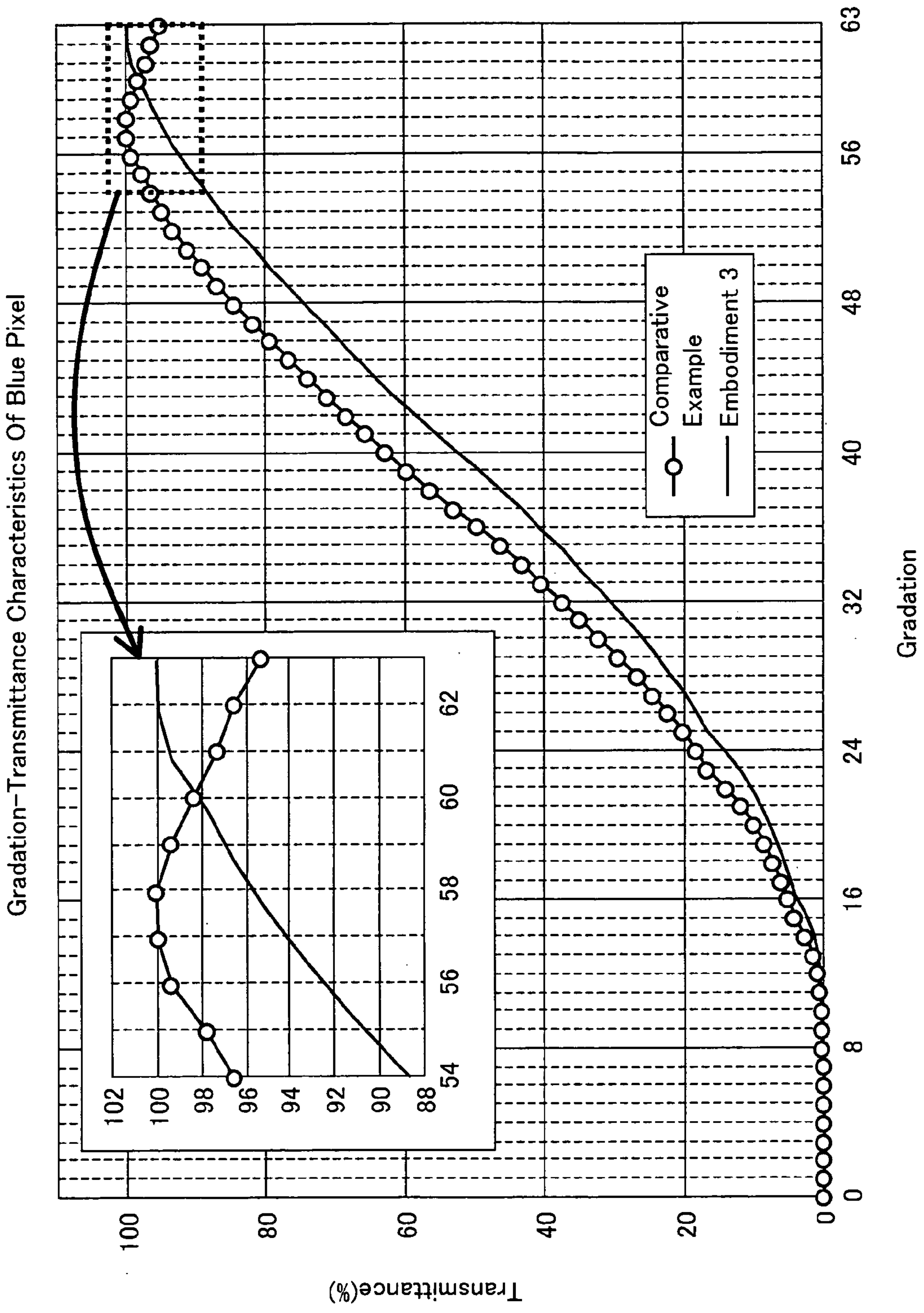

FIG. 18 is a graph showing a relationship between a gradation value of blue image data and transmittance (gradation-transmittance characteristics) in the liquid crystal display device of Embodiment 3 of the present invention.

Figure 19:
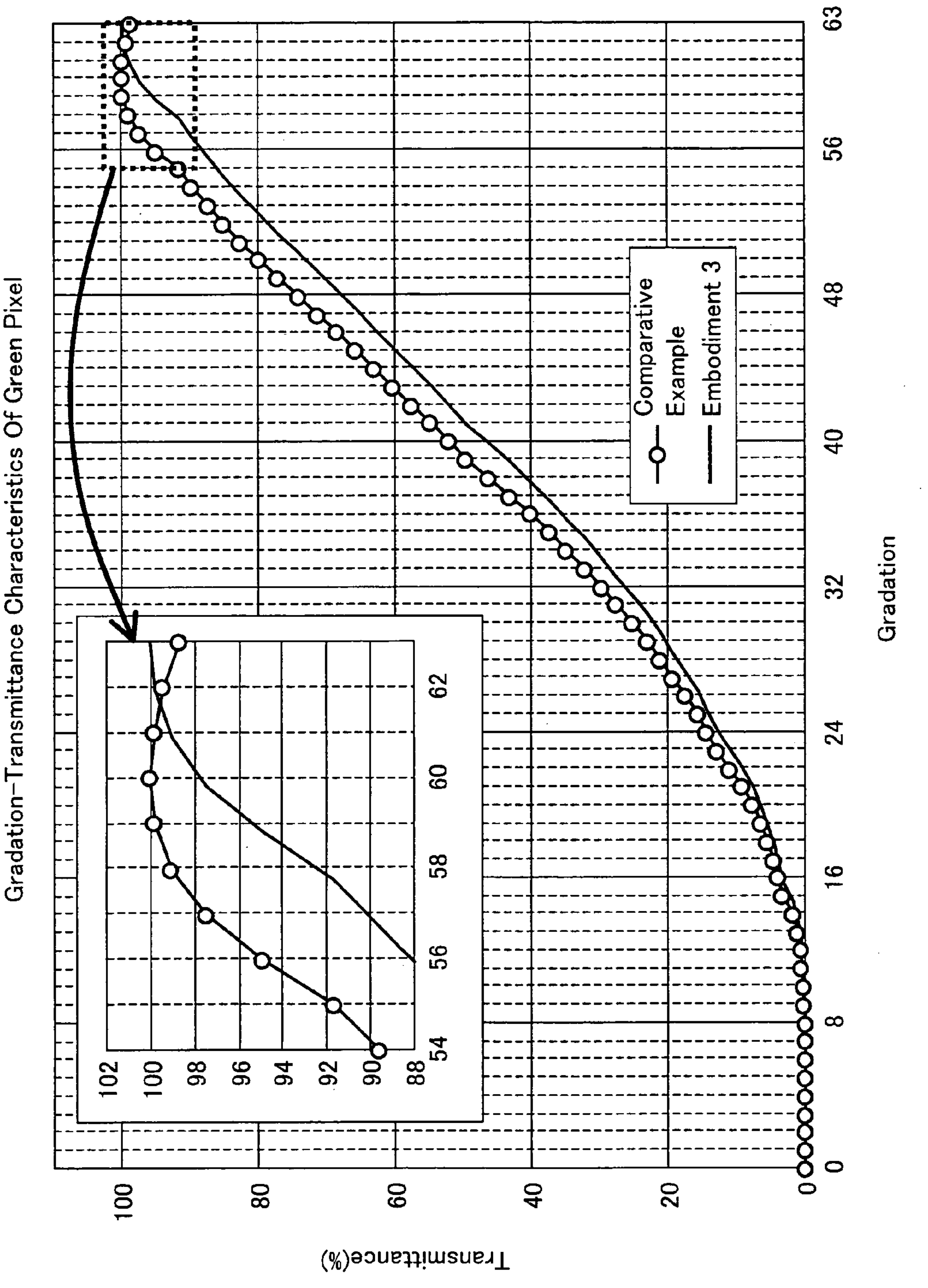

FIG. 19 is a graph showing a relationship between a gradation value of green image data and transmittance (gradation-transmittance characteristics) in the liquid crystal display device of Embodiment 3 of the present invention.

Figure 20:
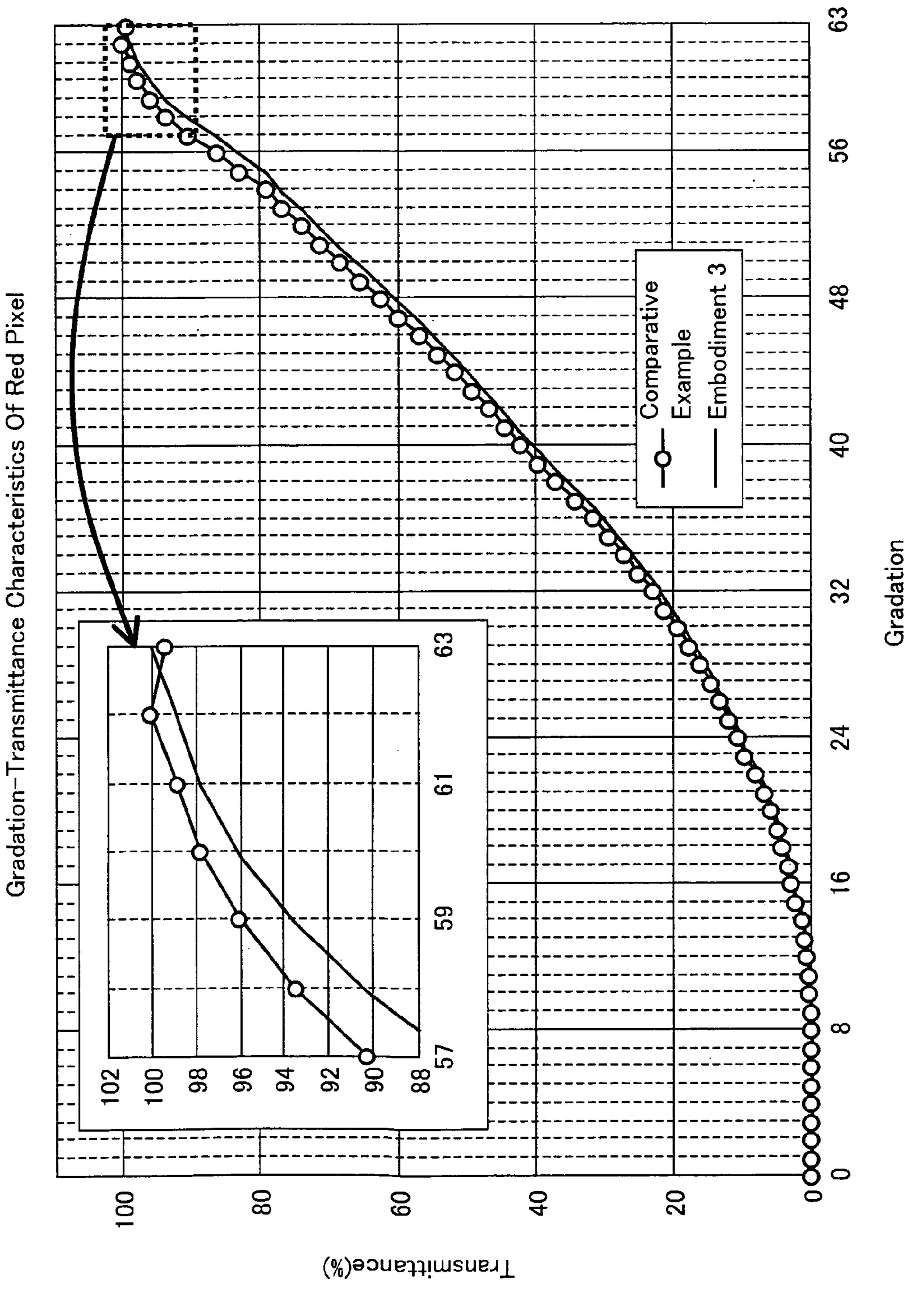

FIG. 20 is a graph showing a relationship between a gradation value of red image data and transmittance (gradation-transmittance characteristics) in the liquid crystal display device of Embodiment 3 of the present invention.

Figures 21, 22:
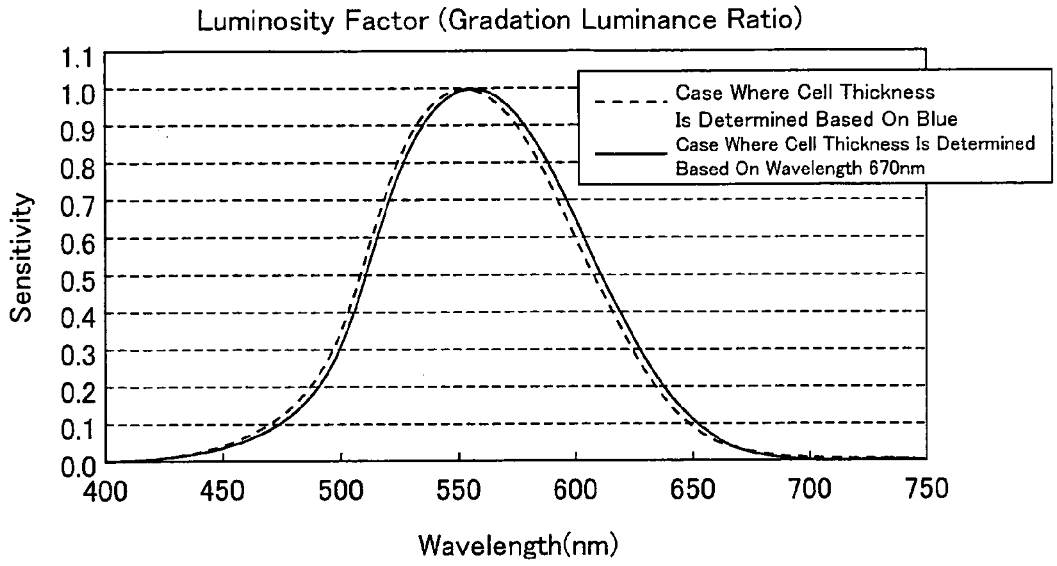

FIG. 21 is a graph showing relationships between a wavelength of light and a luminosity factor in a liquid crystal display panel of Embodiment 3 of the present invention and in a conventional liquid crystal display panel.

FIG. 22 is a table showing a result of evaluation of panel properties in the liquid crystal display device of Embodiment 3 of the present invention and in a conventional liquid crystal display device.

Figures 23, 24:
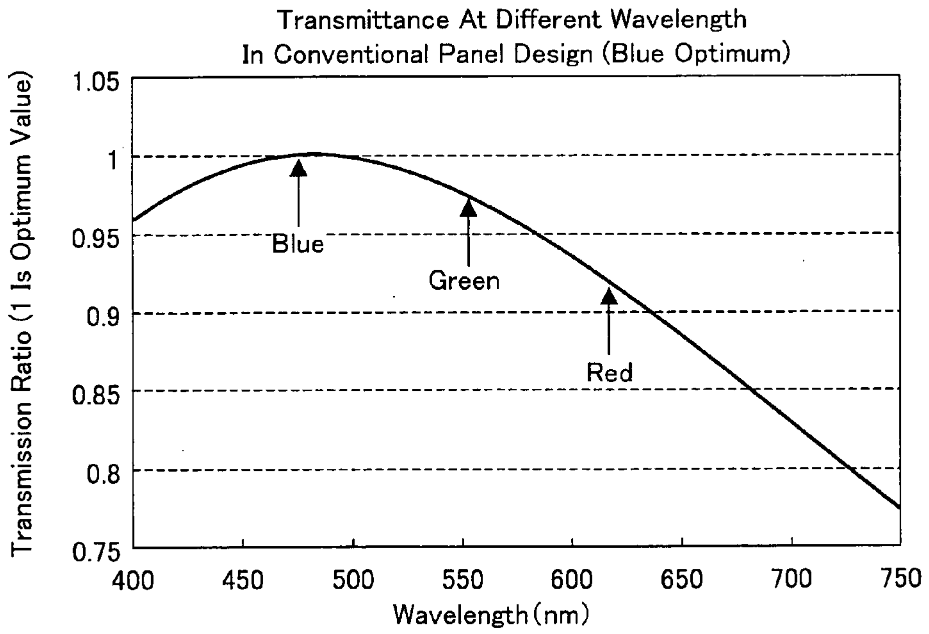

FIG. 23 is a table showing a luminance ratio of colors of color filters and transmittance for respective optimum retardation. In FIG. 23, an upper table shows values obtained in a case where no digital γ processing is carried out, and a lower table shows values obtained in a case where digital γ processing is carried out.

FIG. 24 is a graph showing how transmittance changes depending on a wavelength in a conventional liquid crystal display panel.

DESCRIPTION OF EMBODIMENTS

Embodiment 1

Embodiment 1 of the present invention is described below with reference to FIGS. 1 through 7. Note that the present invention is not limited to this.

The present embodiment deals with, as an example, a liquid crystal display device which includes a TN mode liquid crystal display panel and in which polarization plates are disposed so that normally white mode can be realized. The liquid crystal display device of the present embodiment has a liquid crystal display panel constituted by pixels of three colors, i.e., red (R), green (G), and blue (B) so that a color image can be displayed. In the present specification, a pixel (pixel electrode) that corresponds to 1 color of a color filter is defined as 1 pixel.

FIG. 2 illustrates a configuration of a liquid crystal display device 10 of the present embodiment.

As illustrated in FIG. 2, the liquid crystal display device 10 mainly includes: a liquid crystal display panel (LCD panel) 11, a gate driving circuit 12, a source driving circuit 13, a timing controller 14, and a display control circuit 15 (gradation conversion section).

The liquid crystal display panel 11 includes: an active matrix substrate, a counter substrate, and a liquid crystal layer sandwiched between the active matrix substrate and the counter substrate although these are not illustrated in FIG. 2. The liquid crystal display panel 11 of the present embodiment is a TN mode liquid crystal display panel. Further, the liquid crystal display panel 11 includes two polarization plates (λ/2 plates), one being disposed outside the active matrix substrate and the other being disposed outside the counter substrate. The liquid crystal display panel 11 is driven so that a normally white mode can be realized.

The gate driving circuit 12 is a circuit for supplying scanning signals to scanning signal lines provided on the liquid crystal display panel 11.

The source driving circuit 13 is a circuit for supplying data signals to data signal lines provided on the liquid crystal display panel 11.

The timing controller 14 determines timing at which the signals are supplied to the scanning signal lines and the data signal lines provided on the liquid crystal display panel. The signals supplied from the timing controller 14 are delivered to the scanning signal lines and the data signal lines of the liquid crystal display panel 11 via the gate driving circuit 12 and the source driving circuit 13.

The display control circuit 15 carries out data processing with respect to inputted video signals of respective colors (R, G, and B), and supplies gradation data to pixels of the colors in the liquid crystal display panel 11.

According to the arrangement, the gradation data that has been subjected to the data processing in the display control circuit 15 is supplied to the pixels in the liquid crystal display panel 11 via the timing controller 14 and the source driving circuit 13. Thus, an image based on the inputted video signals is displayed.

Further, the display control circuit 15 includes display data switching circuits 21, 22, and 23 (gradation conversion sections) and look-up tables (LUTs) 24, 25, and 26. The display data switching circuits 21, 22, and 23 are circuits which generate, from inputted video signals, image data for displaying a desired image. In the present embodiment, gradation conversion processing (γ conversion processing) etc. is carried out so that an image can be displayed at desired luminance. This gradation conversion processing is carried out with reference to the look-up tables. The look-up tables are tables in which input gradation values are associated one-to-one with output gradation values.

In the present embodiment, the display data switching circuits 21, 22, and 23 and LUTs 24, 25, and 26 are provided so as to be associated with different video signals. Specifically, the display data switching circuit 21 and the LUT 24 are associated with a red video signal, the display data switching circuit 22 and the LUT 25 are associated with a green video signal, and the display data switching circuit 23 and the LUT 26 are associated with a blue video signal. This makes it possible to carry out different gradation conversion processing with respect to video signals of different colors.

Further, in addition to the above arrangement, the display control circuit 15 includes a pseudo multi-gradation circuit 27 (pseudo multi-gradation section) for carrying out pseudo multi-gradation processing with respect to image data. In the present embodiment, the pseudo multi-gradation circuit 27 is provided in the series of processing circuits for the blue image data since pseudo multi-gradation processing is carried out only with respect to image data subjected to gradation value shifting processing.

The following description deals with display driving carried out in the liquid crystal display device 10.

(a) of FIG. 1 schematically shows a flow of the display driving carried out in the liquid crystal display device 10. (b) of FIG. 1 schematically shows a flow of the display driving carried out in a conventional liquid crystal display device 500 for comparison.

As shown in (a) and (b) of FIG. 1, in the conventional liquid crystal display device 500, a cell thickness is determined so that pixels of blue, which has the shortest wavelength among R, G, and B, have optimum transmittance. Meanwhile, in the liquid crystal display device 10 of the present embodiment, a cell thickness is determined so that pixels of green, which has a longer wavelength than blue, have optimum transmittance.

The following describes how a cell thickness is determined in designing a liquid crystal display panel.

A liquid crystal display panel is designed so that as high transmittance as possible can be obtained. As for a normally white mode liquid crystal display panel using λ/2 plates as upper and lower plates of the panel like the liquid crystal display panel of the present embodiment, transmittance is calculated from the following equation:

$$T = 1 - \frac{\sin^2\left(\frac{\pi}{2}\sqrt{(1+u^2)}\right)}{(1+u^2)} \quad \text{equation (1)}$$

where T is transmittance and u is a retardation value.

As is clear from the equation (1), transmittance is determined by the retardation value u of light. The retardation value u is calculated from the following equation (2):

$$u = 2\Delta nd/\lambda \quad \text{equation (2)}$$

where Δn is birefringence of a liquid crystal material, d is a cell thickness, and λ is a transmitting wavelength. As is clear from the equation (2), the retardation value u is determined by birefringence of a liquid crystal material, a cell thickness, and a transmitting wavelength. Accordingly, in a case where the liquid crystal material has been already determined, a specific transmitting wavelength is used as a standard, and a cell thickness is selected so that a desired retardation value is obtained at the transmitting wavelength used as a standard.

Note that transmittance obtained from the equation (1) is transmittance of a liquid crystal layer. In an actual liquid crystal display device, light emitted from a backlight transmits not only a liquid crystal layer, but also other components such as polarization plates. Accordingly, transmittance of a liquid crystal display device is calculated based on not only the transmittance obtained from the equation (i), but also transmittance of polarization plates, transmittance of a color filter, an aperture ratio of a liquid crystal panel, light focusing power of a backlight, etc.

In the conventional liquid crystal display device 500, a cell thickness is determined on the basis of a retardation value which is based on a wavelength of blue light which has the shortest wavelength among R, G, and B as described above. This is because in a case where a cell thickness is determined on the basis of a retardation value which is based on a wavelength longer than the wavelength of blue, there arises a problem that, in a high gradation region, grayscale inversion occurs in pixels having a color whose wavelength is shorter than the wavelength based on which the retardation value is determined.

The grayscale inversion is a phenomenon by which transmittance of an image obtained by a low gradation value is made higher than transmittance of an image obtained by a high gradation value. This can cause a reduction in display quality. FIG. 3 shows an example in which grayscale inversion occurs. FIG. 3 shows gradation-transmittance characteristics (γ characteristics) for respective colors that are obtained in a case where a cell thickness is set to 3.8 μm and where gradation characteristics are determined on the basis of white (mixture of R, G, and B) light. As shown in FIG. 3, grayscale inversion occurs for blue which has the shortest wavelength.

In view of this, in the conventional liquid crystal display device 500, a cell thickness is determined on the basis of a retardation value which is based on the wavelength of blue light which has the shortest wavelength among R, G, and B.

However, in a case where a cell thickness is determined on the basis of a retardation value which is based on the shortest wavelength as in the liquid crystal display device 500, sufficient transmittance cannot be obtained in green and red pixels as shown in FIG. 24.

In view of this, in the liquid crystal display device 10 of the present embodiment, a cell thickness is determined on the basis of a wavelength of a color whose wavelength is longer than blue so that transmittance is improved in green and red pixels.

FIG. 4 shows how transmittance changes depending on a wavelength in the liquid crystal display device 10 in which a cell thickness is determined on the basis of the wavelength of green (see the solid line). FIG. 4 also shows how transmittance changes depending on a wavelength in the liquid crystal display device 500 in which a cell thickness is determined on the basis of the wavelength of blue (see the broken line).

As shown in FIG. 4, in the conventional liquid crystal display device 500, transmittance reaches a maximum in the vicinity of blue (in the vicinity of 450 nm), and transmittance becomes smaller as the wavelength becomes larger from the vicinity of green (vicinity of 550 nm) to the vicinity of red (vicinity of 620 nm). In contrast to this, in the liquid crystal display device 10 of the present embodiment, transmittance reaches a maximum in the vicinity of green (in the vicinity of 550 nm), and transmittance becomes smaller as the distance from this wavelength becomes larger. However, a degree of reduction in transmittance in the vicinity of red (in the vicinity of 620 nm) is smaller as compared to the conventional liquid crystal display device 500. Accordingly, the liquid crystal display device 10 can achieve brighter display on the whole as compared to the conventional liquid crystal display device 500.

In the present embodiment, a cell thickness d is, for example, 3.8 μm in a case where birefringence Δn of a liquid crystal material is 0.130, for example.

In a case where the cell thickness is determined based on the wavelength of green, grayscale inversion undesirably occurs in pixels of blue whose wavelength is shorter than green as described above. In view of this, in the liquid crystal display device 10 of the present embodiment, the R, G, and B video signals are subjected to different gradation value conversion (γ conversion) in the display control circuit 15 (see FIG. 1). This is described below with reference to FIGS. 2 and 5.

In the liquid crystal display device 10 of the present embodiment, since blue image data has a problem of grayscale inversion, the display data switching circuit 23 carries out gradation value shifting processing for shifting input gradation values to lower gradation values. This gradation conversion is carried out with reference to the look-up table 26.

As for red and green image data in which no grayscale inversion occurs, gradation conversion processing similar to a conventional one is carried out. Also in this case, the gradation conversion is carried out with reference to the look-up tables 24 and 25 that correspond to the display data switching circuits 21 and 22, respectively.

FIG. 5 shows a relationship between a gradation value of the blue image data and transmittance in the liquid crystal display device 10 which relationship is obtained after the gradation value shifting processing is carried out. In FIG. 5, a gradation-transmittance characteristic of the blue image data of the present embodiment is indicated by the solid line (without white circles), and a gradation-transmittance characteristic of blue image data that has not been subjected to the gradation shifting processing is indicated as a comparative example by the line with white circles. An upper left corner of the graph of FIG. 5 shows an enlarged view of a high gradation side (gradation values 54 through 63) in which grayscale inversion can occur.

As shown in FIG. 5, in the comparative example in which no gradation shifting processing is carried out, grayscale inversion occurs in a high gradation region (gradation values of 59 and higher). Meanwhile, in the liquid crystal display device 10, the gradation value 58 at which transmittance is highest is used as the gradation value 63. That is, in a case where an input gradation value is 63, the display data switching circuit 23 shifts the gradation value 63 to the lower gradation value 58. In this way, the display data switching circuit 23 shifts input gradation values to lower gradation values so that output gradation values become smaller than the input gradation values in every gradation region.

In the liquid crystal display device 10 of the present embodiment, the pseudo multi-gradation circuit 27 carries out interpolation of gradation values in order to prevent a tone jump caused by a reduction in the number of available gradations that occurs as a result of the gradation value shifting processing.

The pseudo multi-gradation circuit 27 carries out pseudo multi-gradation processing with respect to image data by using a known multi-gradation technique. The pseudo multi-gradation processing is processing which causes a human eye to believe that the number of gradations that can be expressed has increased although the number of gradations that can be expressed is limited in fact. This utilizes nature of the human eye (i.e., the human eye perceives, as luminance, time- and space-averaged luminance). The pseudo multi-gradation processing is classified into various types (e.g. FRC) depending on a size of a pixel region which serves as a unit or design of a noise pattern (i.e., noise pattern in each frame, the number of periodic frames etc.).

For example, Patent Literature 2 (Japanese Patent Application Publication, Tokukai, No. 2005-10520A (Publication Date: Jan. 13, 2005)) discloses a specific method of the pseudo multi-gradation processing. This method is applicable also to the present invention.

The pseudo multi-gradation processing makes it possible to achieve gradation expressing capability equivalent to that of general image display using gradation values 0 to 63 even though the number of available gradations is reduced by the gradation value shifting processing.

As a result of the above processing, blue image data having the gradation-transmittance characteristic as shown in FIG. 5 can be obtained. FIG. 5 shows an example in which 6-bit (gradation values 0 to 63) gradation data is used, but the present invention is not limited to this.

FIG. 6 is a graph showing a relationship between a wavelength of light and a luminosity factor in the liquid crystal display device 10 of the present embodiment. In FIG. 6, a luminosity factor in the liquid crystal display panel of the present embodiment is indicated by the solid line, and a luminosity factor obtained in a case where a cell thickness is determined on the basis of blue is indicated by the broken line for comparison.

As shown in FIG. 6, in the liquid crystal display device of the present embodiment, the luminosity factor is improved on the whole especially around the wavelength of green light (in the vicinity of 550 nm), as compared to the conventional example indicated by the broken line. Human eyes have high sensitivity to green light, and therefore tend to feel higher brightness as transmittance of green pixels becomes higher.

Accordingly, in a case where a cell thickness is determined so that transmittance of green pixels becomes optimum as in the present embodiment, it is possible to display an image which allows human eyes to feel higher brightness.

FIG. 7 shows a result of evaluation of panel properties in the liquid crystal display device 10. In the table of FIG. 7, a liquid crystal display panel in which a cell thickness is determined based on blue light is shown as a conventional art, and a liquid crystal display panel in which a cell thickness is determined based on green light but in which the gradation value shifting processing is not carried out is shown as a comparative example.

As shown in FIG. 7, in the conventional art, a cell thickness is 3.1 μm which is determined based on the blue light. Meanwhile, in each of the panels of the comparative example and the present Embodiment 1, a cell thickness is determined based on green light, and is therefore larger than the panel of the conventional art. Specifically, the cell thickness of each of the panels of the comparative example and the present Embodiment 1 is 3.8 μm.

An actual measurement value of transmittance of white display of the panel of the conventional art is 4.43%, whereas actual measurement values of transmittance of white display of the panels of the comparative example and Embodiment 1 are 4.92% and 5.01%, respectively. This reveals that the panels of the comparative example and Embodiment 1 have improved transmittance as compared to the panel of the conventional art. Further, in a case where transmittance of white display (indicated by "White" in FIG. 7) in the panel of the conventional art is set to 1 (reference value), a transmittance ratio among the conventional art, the comparative example, and Embodiment 1 is 1:1.11:1.13. This reveals that transmittance of the liquid crystal display device of the present embodiment is improved by 13% as compared with the conventional liquid crystal display device.

Note that the white display is mixture of red, green, and blue display. FIG. 7 also shows transmittance ratios in the blue, green, and red display (indicated by "Blue", "Green", and "Red" in FIG. 7).

The bottom of the table of FIG. 7 shows presence or absence of grayscale inversion (presence of grayscale inversion is indicated by "x (OCCUR)", and absence of grayscale inversion is indicated by "○ (NOT OCCUR)"). As shown in FIG. 7, in the panel of the comparative example, grayscale inversion occurs in a blue image, whereas no grayscale inversion occurs in the panel of Embodiment 1 in which the gradation value shifting processing is carried out with respect to the blue image data. It can be hypothesized that this is reflected in the transmittance ratio of blue display, transmittance ratio of white display, and actual measurement values of transmittance.

FIG. 23 shows simulation values of luminance ratios among R, G, and B of a color filter and transmittance ratios of the liquid crystal display device that are obtained in a case where a cell thickness is determined based on B, G, and R, respectively. Note that the upper table of FIG. 23 shows values obtained in a case where no digital γ processing is carried out (i.e., case where only the process of changing a cell thickness is carried out), and the lower table of FIG. 23 shows values obtained in a case where the digital γ processing is carried out. The "G optimum" row of the lower table of FIG. 23 shows simulation values for the liquid crystal display device of the present embodiment. Note that, in an actual liquid crystal display device, light focusing power of a backlight and polarization plates affect these simulation values.

As is clear from FIG. 23, in the liquid crystal display device of the present embodiment (G optimum), luminance of W (white) obtained by mixing R, G, and B and transmittance are improved as compared to the conventional example (B optimum). That is, it has been confirmed that an overall transmittance can be made higher in a case where a cell thickness is determined on the basis of green which has a longer wavelength than blue, as compared to a case where a cell thickness is determined on the basis of blue which has the shortest wavelength.

As described above, in the liquid crystal display device of the present embodiment, a cell thickness is determined on the basis of a retardation value which is based not on the wavelength of blue light which has the shortest wavelength among R, G, and B, but on the wavelength of green light. This allows not only an improvement in transmittance of green pixels, but also an improvement in transmittance of red pixels, thereby improving overall transmittance of an image displayed by a combination of R, G, and B.

In the present embodiment, a cell thickness is determined so that transmittance in green pixels having a high luminosity factor becomes optimum, it is possible to display an image which allows a person to feel higher brightness.

Further, it is possible to prevent occurrence of grayscale inversion in blue pixels by carrying out gradation value shifting processing of shifting input gradation values into lower gradation values with respect to image data supplied to the pixels of blue which has shorter wavelength than green based on which a cell thickness is determined. This allows an improvement in quality of a displayed image.

The present embodiment has dealt with an example in which a TN mode liquid crystal display panel is used. However, the present invention is not limited to this, and can be also applied to liquid crystal display panels of other modes such as IPS mode and VA mode.

The present embodiment has dealt with an example in which a normally white mode liquid crystal display panel is used. However, the present invention is not limited to this, and can be also applied to a normally black mode liquid crystal display panel.

Embodiment 2

Next, Embodiment 2 of the present invention is described below with reference to FIGS. 8 through 14. The present embodiment mainly discusses differences from Embodiment 1, and in a case where configuration and driving method similar to those of Embodiment 1 can be applied, explanation of such configuration and driving method are omitted.

The present embodiment also deals with, as an example, a liquid crystal display device which includes a TN mode liquid crystal display panel and in which polarization plates are disposed so that normally white mode can be realized, as in Embodiment 1.

FIG. 8 illustrates a configuration of a liquid crystal display device 110 of the present embodiment.

As illustrated in FIG. 8, the liquid crystal display device 110 mainly includes: a liquid crystal display panel (LCD panel) 11, a gate driving circuit 12, a source driving circuit 13, a timing controller 14, and a display control circuit 115 (gradation conversion section).

The liquid crystal display panel (LCD panel) 11, gate driving circuit 12, source driving circuit 13, and timing controller 14 have similar arrangements to those of the liquid crystal display device 10 of Embodiment 1, and therefore are not explained repeatedly.

The display control circuit 115 carries out data processing with respect to inputted video signals of respective colors (R, G, and B) and supplies gradation data to R, G, and B pixels within the liquid crystal display panel 11. The gradation data that has been subjected to the data processing in the display control circuit 115 is supplied to the pixels within the liquid crystal display panel 11 via the timing controller 14 and the source driving circuit 13. Thus, an image based on the inputted video signals is displayed.

Further, the display control circuit 115 includes display data switching circuits 121, 122, and 123 (gradation conversion sections) and look-up tables (LUTs) 124, 125, and 126.

The display data switching circuits 121, 122, and 123 are circuits which generate, from inputted video signals, image data for performing desired image display. Here, gradation conversion processing (γ conversion processing) is carried out so that display can be carried out at desired luminance. This gradation conversion processing is carried out with reference to the look-up tables. The look-up tables are tables in which input gradation values are associated one-to-one with output gradation values.

In the present embodiment, the display data switching circuits and LUTs are associated with different video signals. Specifically, the display data switching circuit 121 and the LUT 124 are associated with a red video signal, the display data switching circuit 122 and the LUT 125 are associated with a green video signal, and the display data switching circuit 123 and the LUT 126 are associated with a blue video signal. This makes it possible to carry out different gradation conversion processing with respect to video signals of different colors.

Further, in addition to the above arrangement, the display control circuit 115 includes pseudo multi-gradation circuits 127 and 128 (pseudo multi-gradation sections) for carrying out pseudo multi-gradation processing with respect to image data. In the present embodiment, the pseudo multi-gradation circuits 127 and 128 are provided in the series of processing circuits for the blue image data and in the series of processing circuits for the green image data, respectively, since pseudo multi-gradation processing is carried out only with respect to image data subjected to gradation value shifting processing.

The following description deals with display driving carried out in the liquid crystal display device 110.

In the conventional liquid crystal display device 500, a cell thickness is determined so that pixels of blue which has the shortest wavelength among R, G, and B have optimum transmittance (see (b) of FIG. 1). Meanwhile, in the liquid crystal display device 110 of the present embodiment, a cell thickness is determined on the basis of a wavelength of a color whose wavelength is longer than that of blue so that transmittance in green and red pixels is improved, as in Embodiment 1. Specifically, in the present embodiment, a cell thickness is determined so that pixels of red which has a longer wavelength than blue and green have optimum transmittance.

The cell thickness determining method described in Embodiment 1 can be applied also to the present embodiment. However, since, in the present embodiment, a cell thickness is determined so that red pixels have optimum transmittance, the transmitting wavelength λ used as a standard in the equation 2 is set to 620 nm which is the wavelength of red, and a cell thickness is selected so that a desired retardation value can be obtained at this transmitting wavelength.

FIG. 10 shows how transmittance changes depending on a wavelength in the liquid crystal display device 110 in which a cell thickness is determined on the basis of the wavelength of red (see the solid line). FIG. 10 also shows how transmittance changes depending on a wavelength in the conventional liquid crystal display device 500 in which a cell thickness is determined on the basis of the wavelength of blue (see the broken line).

As shown in FIG. 10, in the conventional liquid crystal display device 500, transmittance reaches a maximum in the vicinity of blue (in the vicinity of 450 nm), and transmittance becomes smaller as the wavelength becomes larger from the vicinity of green (vicinity of 550 nm) to the vicinity of red (vicinity of 620 nm). In contrast to this, in the liquid crystal display device 110 of the present embodiment, transmittance reaches a maximum in the vicinity of red (in the vicinity of 620 nm), and transmittance becomes smaller as the distance from this wavelength becomes larger. However, transmittance at the wavelength in the vicinity of green (in the vicinity of 550 nm), which has the highest luminosity factor among R, G, and B, is higher than that of the conventional liquid crystal display device 500. Accordingly, the liquid crystal display device 110 can achieve brighter display on the whole as compared to the conventional liquid crystal display device 500.

In the present embodiment, a cell thickness d is, for example, 4.2 μm in a case where birefringence Δn of a liquid crystal material is 0.130, for example.

As described in Embodiment 1, in a case where a cell thickness is determined on the basis of the wavelength of red, there arises a problem that grayscale inversion occurs in pixels of blue and green which have shorter wavelength than red. FIG. 9 shows gradation-transmittance characteristics (γ characteristics) for respective colors that are obtained in a case where a cell thickness is set to 4.2 μm on the basis of red and where gradation characteristics are determined on the basis of white (mixture of R, G, and B) light. As shown in FIG. 9, grayscale inversion occurs in image data of blue and green which have shorter wavelength than red.

In view of this, in the liquid crystal display device 110 of the present embodiment, the display control circuit 115 carries out different gradation value conversion (γ conversion) with respect to R, G, and B video signals (see (a) of FIG. 1). This is described below with reference to FIGS. 8, 11, and 12.

In the liquid crystal display device 110 of the present embodiment, there occurs a problem of grayscale inversion in blue image data and green image data. In view of this, gradation value shifting processing for shifting input gradation values to lower gradation values is carried out in the display data switching circuits 122 and 123. This gradation conversion is carried out with reference to the look-up tables 125 and 126.

As for red image data in which no grayscale inversion occurs, gradation conversion processing similar to the conventional one is carried out. Also in this case, the gradation conversion is carried out with reference to the look-up table 124 that corresponds to the display data switching circuit 121.

FIG. 11 shows a relationship between a gradation value of the blue image data and transmittance in the liquid crystal display device 110 which relationship is obtained after the gradation value shifting processing is carried out. In FIG. 11, a gradation-transmittance characteristic of the blue image data of the present embodiment is indicated by the solid line (without white circles), and a gradation-transmittance characteristic of blue image data that has not been subjected to the gradation shifting processing is indicated as a comparative example by the line with white circles. An upper left portion of the graph of FIG. 11 shows an enlarged view of a higher gradation side (gradation values 54 through 63) in which grayscale inversion can occur.

As shown in FIG. 11, in the comparative example in which no gradation shifting processing is carried out, grayscale inversion occurs in a high gradation region (gradation values of 58 and larger). Meanwhile, in the liquid crystal display device 110, the gradation value 57 at which transmittance is highest is used as the gradation value 63. That is, in a case where an input gradation value is 63, the display data switching circuit 123 shifts the gradation value to a lower gradation value 57. In this way, the display data switching circuit 123 shifts input gradation values to lower gradation values so that output gradation values become smaller than the input gradation values in every gradation region.

FIG. 12 shows a relationship between a gradation value of the green image data and transmittance in the liquid crystal display device 110 which relationship is obtained after the gradation value shifting processing is carried out. In FIG. 12, a gradation-transmittance characteristic of the green image data of the present embodiment is indicated by the solid line (without white circles), and a gradation-transmittance characteristic of green image data that has not been subjected to the gradation shifting processing is indicated as a comparative example by the line with white circles. An upper left portion of the graph of FIG. 12 shows an enlarged view of a higher gradation side (gradation values 54 through 63) in which grayscale inversion can occur.

As shown in FIG. 12, in the comparative example in which no gradation shifting processing is carried out, grayscale inversion occurs in a high gradation region (gradation values of 61 and larger). Meanwhile, in the liquid crystal display device 110, the gradation value 60 at which transmittance is highest is used as the gradation value 63. That is, in a case where an input gradation value is 63, the display data switching circuit 122 shifts the gradation value to a lower gradation value 60. In this way, the display data switching circuit 122 shifts input gradation values to lower gradation values so that output gradation values become smaller than the input gradation values in every gradation region.

In the liquid crystal display device 110 of the present embodiment, the pseudo multi-gradation circuits 127 and 128 carry out interpolation of gradation values in order to prevent a tone jump caused by reduction in the number of available gradations that occurs due to the gradation value shifting process.

The pseudo multi-gradation processing carried out in the pseudo multi-gradation circuits 127 and 128 is similar to that described in Embodiment 1, and therefore is not explained repeatedly.

The pseudo multi-gradation processing makes it possible to achieve gradation expressing capability equivalent to that of general image display using gradation values 0 to 63 even though the number of available gradations is reduced by the gradation value shifting processing.

As a result of the above processing, blue image data having the gradation-transmittance characteristic as shown in FIG. 11 can be obtained, and green image data having the gradation-transmittance characteristic as shown in FIG. 12 can be obtained. FIGS. 11 and 12 show an example in which 6-bit (gradation values 0 to 63) gradation data is used, but the present invention is not limited to this.

FIG. 13 is a graph showing a relationship between a wavelength of light and a luminosity factor in the liquid crystal display device 110 of the present embodiment. In FIG. 13, a luminosity factor in the liquid crystal display panel of the present embodiment is indicated by the solid line, and a luminosity factor obtained in a case where a cell thickness is determined on the basis of blue is indicated by the broken line for comparison.

As shown in FIG. 13, in the liquid crystal display device 110 of the present embodiment, the luminosity factor is improved on the whole especially around the wavelength of red light (in the vicinity of 620 nm), as compared to the conventional example indicated by the broken line.

FIG. 14 shows a result of evaluation of panel properties in the liquid crystal display device 110. In the table of FIG. 14, a liquid crystal display panel in which a cell thickness is determined based on blue light is shown as a conventional art, and a liquid crystal display panel in which a cell thickness is determined based on red light but in which the gradation value shifting processing is not carried out is shown as a comparative example.

As shown in FIG. 14, in the conventional art, a cell thickness is 3.1 μm which is determined based on the blue light. Meanwhile, in each of the panels of the comparative example and the present Embodiment 2, a cell thickness is determined based on red light, and is therefore larger than that of the conventional art. Specifically, the cell thickness of each of the panels of the comparative example and the present Embodiment 2 is 4.2 μm.

An actual measurement value of transmittance of white display of the panel of the conventional art is 4.43%, whereas actual measurement values of transmittance of white display of the panels of the comparative example and Embodiment 2 are 4.74% and 4.83%, respectively. This reveals that the panels of the comparative example and Embodiment 2 have improved transmittance as compared to the panel of the conventional art. Further, in a case where transmittance of white display (indicated by "White" in FIG. 14) in the panel of the conventional art is set to 1 (reference value), a transmittance ratio among the conventional art, the comparative example, and Embodiment 2 is 1:1.07:1.09. This reveals that transmittance of the liquid crystal display device of the present embodiment is improved by 9% as compared with the conventional liquid crystal display device.

Note that the white display is mixture of red, green, and blue display. FIG. 14 also shows transmittance ratios in the blue, green, and red display (indicated by "Blue", "Green", and "Red" in FIG. 14).

The bottom of the table of FIG. 14 shows presence or absence of grayscale inversion (presence of grayscale inversion is indicated by "x (OCCUR)", and absence of grayscale inversion is indicated by "○ (NOT OCCUR)"). As shown in FIG. 14, in the panel of the comparative example, grayscale inversion occurs in blue and green images, whereas no grayscale inversion occurs in the panel of Embodiment 2 in which the gradation value shifting processing is carried out with respect to the blue and green image data. It can be hypothesized that this is reflected in the transmittance ratios of blue display and green display, transmittance ratio of white display, and actual measurement values of transmittance.

FIG. 23 shows simulation values of luminance ratios among R, G, and B of a color filter and transmittance ratios of the liquid crystal display device that are obtained in a case where a cell thickness is determined based on B, G, and R, respectively. Note that the upper table of FIG. 23 shows values obtained in a case where no digital γ processing is carried out (i.e., case where only the process of changing a cell thickness is carried out), and the lower table of FIG. 23 shows values obtained in a case where the digital γ processing is carried out. The "R optimum" row of the lower table of FIG. 23 shows simulation values for the liquid crystal display device of the present embodiment. Note that, in an actual liquid crystal display device, light focusing power of a backlight and polarization plates affect these simulation values.

As is clear from FIG. 23, in the liquid crystal display device of the present embodiment (R optimum), luminance of W (white) obtained by mixing R, G, and B and transmittance are improved as compared to the conventional example (B optimum). That is, it has been confirmed that an overall transmittance can be made higher in a case where a cell thickness is determined on the basis of red which has a longer wavelength than blue, as compared to a case where a cell thickness is determined on the basis of blue which has the shortest wavelength.

As described above, in the liquid crystal display device of the present embodiment, a cell thickness is determined on the basis of a retardation value which is based not on the wavelength of blue light which has the shortest wavelength among R, G, and B, but on the wavelength of red light. This allows not only an improvement in transmittance of red pixels, but also an improvement in transmittance of green pixels, thereby improving overall transmittance of an image displayed by a combination of R, G, and B.

Further, in a case where a cell thickness is determined on the basis of red, the cell thickness can be made larger as compared with a case where the cell thickness is determined on the basis of blue or green. This produces an effect of improvement in durability of a liquid crystal display panel against mixing in of a foreign substance such as dust.

Further, it is possible to prevent occurrence of grayscale inversion in blue and green pixels by carrying out gradation value shifting processing of shifting input gradation values into lower gradation values with respect to image data supplied to the pixels of blue and green each of which has shorter wavelength than red based on which a cell thickness is determined. This allows an improvement in quality of a displayed image.

Embodiment 2

Next, Embodiment 3 of the present invention is described below with reference to FIGS. 15 through 22. The present embodiment mainly discusses differences from Embodiment 1, and in a case where configuration and driving method similar to those of Embodiment 1 can be applied, explanation of such configuration and driving method are omitted.

The present embodiment also deals with, as an example, a liquid crystal display device which includes a TN mode liquid crystal display panel and in which polarization plates are disposed so that normally white mode can be realized, as in Embodiment 1.

FIG. 15 illustrates a configuration of a liquid crystal display device 210 of the present embodiment.

As illustrated in FIG. 15, the liquid crystal display device 210 mainly includes: a liquid crystal display panel (LCD panel) 11, a gate driving circuit 12, a source driving circuit 13, a timing controller 14, and a display control circuit 215 (gradation conversion section).

The liquid crystal display panel (LCD panel) 11, gate driving circuit 12, source driving circuit 13, and timing controller 14 have similar arrangements to those of the liquid crystal display device 10 of Embodiment 1, and therefore are not explained repeatedly.

The display control circuit 215 carries out data processing with respect to inputted video signals of respective colors (R, G, and B) and supplies gradation data to R, G, and B pixels within the liquid crystal display panel 11. The gradation data that has been subjected to the data processing in the display control circuit 215 is supplied to the pixels within the liquid crystal display panel 11 via the timing controller 14 and the source driving circuit 13. Thus, an image based on the inputted video signals is displayed.

Further, the display control circuit 215 includes display data switching circuits 221, 222, and 223 (gradation conversion sections) and look-up tables (LUTs) 224, 225, and 226. The display data switching circuits 221, 222, and 223 are circuits which generate, from inputted video signals, image data for performing desired image display. Here, gradation conversion processing (γ conversion processing) is carried out so that display can be carried out at desired luminance. This gradation conversion processing is carried out with reference to the look-up tables. The look-up tables are tables in which input gradation values are associated one-to-one with output gradation values.

In the present embodiment, the display data switching circuits and LUTs are associated with different video signals. Specifically, the display data switching circuit 221 and the LUT 224 are associated with a red video signal, the display data switching circuit 222 and the LUT 225 are associated with a green video signal, and the display data switching circuit 223 and the LUT 226 are associated with a blue video signal. This makes it possible to carry out different gradation conversion processing with respect to video signals of different colors.

Further, in addition to the above arrangement, the display control circuit 215 includes pseudo multi-gradation circuits 227, 228, and 229 (pseudo multi-gradation sections) for carrying out pseudo multi-gradation processing with respect to image data. The pseudo multi-gradation processing is carried out with respect to image data subjected to gradation value shifting processing. Since, in the present embodiment, the gradation value shifting processing is carried out with respect to all of the R, G, and B image data, the pseudo multi-gradation circuits 227, 228, and 229 are provided in the series of processing circuits for blue image data, the series of processing circuits for green image data, and the series of processing circuits for red image data, respectively.

The following description deals with display driving carried out in the liquid crystal display device 210.

In the conventional liquid crystal display device 500, a cell thickness is determined so that pixels of blue which has the shortest wavelength among R, G, and B have optimum transmittance (see (b) of FIG. 1). Meanwhile, in the liquid crystal display device 210 of the present embodiment, a cell thickness is determined on the basis of a wavelength of a color whose wavelength is longer than that of blue so that transmittance in green and red pixels is improved, as in Embodiment 1. Specifically, in the present embodiment, a cell thickness is determined so that transmittance becomes optimum at a wavelength (wavelength 670 nm) longer than the wavelength of red light.

The cell thickness determining method described in Embodiment 1 can be applied also to the present embodiment. However, since, in the present embodiment, a cell thickness is determined so that transmittance of light having the wavelength 670 nm becomes optimum, the transmitting wavelength λ used as a standard in the equation 2 is set to 670 nm, and a cell thickness is selected so that a desired retardation value can be obtained at this transmitting wavelength.

FIG. 17 shows how transmittance changes depending on a wavelength in the liquid crystal display device 210 in which a cell thickness is determined on the basis of the wavelength 670 nm (see the solid line). FIG. 17 also shows how transmittance changes depending on a wavelength in the conventional liquid crystal display device 500 in which a cell thickness is determined on the basis of the wavelength of blue (see the broken line).

As shown in FIG. 17, in the conventional liquid crystal display device 500, transmittance reaches a maximum in the vicinity of blue (in the vicinity of 450 nm), and transmittance becomes smaller as the wavelength becomes larger from the vicinity of green (vicinity of 550 nm) to the vicinity of red (vicinity of 620 nm). In contrast to this, in the liquid crystal display device 210 of the present embodiment, transmittance reaches a maximum at the wavelength (in the vicinity of 670 nm) longer than the wavelength of red light, and transmittance becomes smaller as the distance from this wavelength becomes larger.

In the present embodiment, a cell thickness d is, for example, 4.4 μm in a case where birefringence Δn of a liquid crystal material is 0.130, for example.

As described in Embodiment 1, in a case where a cell thickness is determined on the basis of the wavelength 670 nm, there arises a problem that grayscale inversion occurs in pixels of R, G, and B each of which has a shorter wavelength than this wavelength. FIG. 16 shows gradation-transmittance characteristics (γ characteristics) for respective colors that are obtained in a case where a cell thickness is set to 4.4 μm on the basis of the wavelength (specifically the wavelength 670 nm) longer than the wavelength of red and where gradation characteristics are determined on the basis of white (mixture of R, G, and B) light. As shown in FIG. 16, grayscale inversion occurs in image data of blue, green, and red each of which has a shorter wavelength than 670 nm.

In view of this, in the liquid crystal display device 210 of the present embodiment, the display control circuit 215 carries out different gradation value conversion (γ conversion) with respect to R, G, and B video signals (see (a) of FIG. 1). This is described below with reference to FIGS. 15, 18, 19, and 20.

In the liquid crystal display device 210 of the present embodiment, there occurs a problem of grayscale inversion in blue, green, and red image data. In view of this, gradation value shifting processing for shifting input gradation values to lower gradation values is carried out in the display data switching circuits 221, 222, and 123. This gradation conversion is carried out with reference to the look-up tables 224, 225, and 226.

FIG. 18 shows a relationship between a gradation value of the blue image data and transmittance in the liquid crystal display device 210 which relationship is obtained after the gradation value shifting processing is carried out. In FIG. 18, a gradation-transmittance characteristic of the blue image data of the present embodiment is indicated by the solid line (without white circles), and a gradation-transmittance characteristic of blue image data that has not been subjected to the gradation shifting processing is indicated as a comparative example by the line with white circles. An upper left portion of the graph of FIG. 18 shows an enlarged view of a higher gradation side (gradation values 54 through 63) in which grayscale inversion can occur.

As shown in FIG. 18, in the comparative example in which no gradation shifting processing is carried out, grayscale inversion occurs in a high gradation region (gradation values of 59 and larger). Meanwhile, in the liquid crystal display device 210, the gradation value 58 at which transmittance is highest is used as the gradation value 63. That is, in a case where an input gradation value is 63, the display data switching circuit 223 shifts the gradation value to a lower gradation value 58. In this way, the display data switching circuit 223 shifts input gradation values to lower gradation values so that output gradation values become smaller than the input gradation values in every gradation region.

FIG. 19 shows a relationship between a gradation value of the green image data and transmittance in the liquid crystal display device 210 which relationship is obtained after the gradation value shifting processing is carried out. In FIG. 19, a gradation-transmittance characteristic of the green image data of the present embodiment is indicated by the solid line (without white circles), and a gradation-transmittance characteristic of green image data that has not been subjected to the gradation shifting processing is indicated as a comparative example by the line with white circles. An upper left portion of the graph of FIG. 19 shows an enlarged view of a higher gradation side (gradation values 54 through 63) in which grayscale inversion can occur.

As shown in FIG. 19, in the comparative example in which no gradation shifting processing is carried out, grayscale inversion occurs in a high gradation region (gradation values of 61 and larger). Meanwhile, in the liquid crystal display device 210, the gradation value 60 at which transmittance is highest is used as the gradation value 63. That is, in a case where an input gradation value is 63, the display data switching circuit 222 shifts the gradation value to a lower gradation value 60. In this way, the display data switching circuit 222 shifts input gradation values to lower gradation values so that output gradation values become smaller than the input gradation values in every gradation region.

FIG. 20 shows a relationship between a gradation value of the red image data and transmittance in the liquid crystal display device 210 which relationship is obtained after the gradation value shifting processing is carried out. In FIG. 20, a gradation-transmittance characteristic of the red image data of the present embodiment is indicated by the solid line (without white circles), and a gradation-transmittance characteristic of red image data that has not been subjected to the gradation shifting processing is indicated as a comparative example by the line with white circles. An upper left portion of the graph of FIG. 20 shows an enlarged view of a higher gradation side (gradation values 57 through 63) in which grayscale inversion can occur.

As shown in FIG. 20, in the comparative example in which no gradation shifting processing is carried out, grayscale inversion occurs at the highest gradation value 63. Meanwhile, in the liquid crystal display device 210, the gradation value 62 at which transmittance is highest is used as the gradation value 63. That is, in a case where an input gradation value is 63, the display data switching circuit 221 shifts the gradation value to a lower gradation value 62. In this way, the display data switching circuit 221 shifts input gradation values to lower gradation values so that output gradation values become smaller than the input gradation values in every gradation region.

In the liquid crystal display device 210 of the present embodiment, the pseudo multi-gradation circuits 227, 228, and 229 carry out interpolation of gradation values in order to prevent a tone jump caused by reduction in the number of available gradations that occurs due to the gradation value shifting process.

The pseudo multi-gradation processing carried out in the pseudo multi-gradation circuits 227, 228, and 229 is similar to that described in Embodiment 1, and therefore is not explained repeatedly.

The pseudo multi-gradation processing makes it possible to achieve gradation expressing capability equivalent to that of general image display using gradation values 0 to 63 even though the number of available gradations is reduced by the gradation value shifting processing.

As a result of the above processing, blue image data having the gradation-transmittance characteristic as shown in FIG. 18 can be obtained, green image data having the gradation-transmittance characteristic as shown in FIG. 19, and red image data having the gradation-transmittance characteristic as shown in FIG. 20 can be obtained. FIGS. 18, 19, and 20 show an example in which 6-bit (gradation values 0 to 63) gradation data is used, but the present invention is not limited to this.

FIG. 21 is a graph showing a relationship between a wavelength of light and a luminosity factor in the liquid crystal display device 210 of the present embodiment. In FIG. 21, a luminosity factor in the liquid crystal display panel of the present embodiment is indicated by the solid line, and a luminosity factor obtained in a case where a cell thickness is determined on the basis of blue is indicated by the broken line for comparison.

As shown in FIG. 21, in the liquid crystal display device 210 of the present embodiment, the luminosity factor is improved on the whole, as compared to the conventional example indicated by the broken line. This is because transmittance of green and red light can be improved as shown in FIG. 23 since a cell thickness is determined on the basis of the wavelength 670 nm.

FIG. 22 shows a result of evaluation of panel properties in the liquid crystal display device 210. In the table of FIG. 22, a liquid crystal display panel in which a cell thickness is determined based on blue light is shown as a conventional art, and a liquid crystal display panel in which a cell thickness is determined based on the wavelength (specifically the wavelength 670 nm) longer than the wavelength of red but in which the gradation value shifting processing is not carried out is shown as a comparative example.

As shown in FIG. 22, in the conventional art, a cell thickness is 3.1 μm which is determined based on the blue light. Meanwhile, in each of the panels of the comparative example and the present Embodiment 3, a cell thickness is determined based on light of 670 nm, and is therefore larger than that of the conventional art. Specifically, the cell thickness of each of the panels of the comparative example and the present Embodiment 3 is 4.4 μm.

An actual measurement value of transmittance of white display of the panel of the conventional art is 4.43%, whereas actual measurement values of transmittance of white display of the panels of the comparative example and Embodiment 3 are 4.62% and 4.66%, respectively. This reveals that the panels of the comparative example and Embodiment 3 have improved transmittance as compared to the panel of the conventional art. Further, in a case where transmittance of white display (indicated by "White" in FIG. 22) in the panel of the conventional art is set to 1 (reference value), a transmittance ratio among the conventional art, the comparative example, and Embodiment 3 is 1:1.04:1.05. This reveals that transmittance of the liquid crystal display device of the present embodiment is improved by 5% as compared with the conventional liquid crystal display device.

Note that the white display is mixture of red, green, and blue display. FIG. 22 also shows transmittance ratios in the blue, green, and red display (indicated by "Blue", "Green", and "Red" in FIG. 22).

The bottom of the table of FIG. 22 shows presence or absence of grayscale inversion (presence of grayscale inversion is indicated by "x (OCCUR)", and absence of grayscale inversion is indicated by "○ (NOT OCCUR)"). As shown in FIG. 22, in the panel of the comparative example, grayscale inversion occurs in blue, green, and red images, whereas no grayscale inversion occurs in the panel of Embodiment 3 in which the gradation value shifting processing is carried out. It can be hypothesized that this is reflected in the transmittance ratios of blue, green, and red display, transmittance ratio of white display, and actual measurement values of transmittance.

FIG. 23 shows simulation values of luminance ratios among R, G, and B of a color filter and transmittance ratios of the liquid crystal display device that are obtained in a case where a cell thickness is determined based on B, G, and R, respectively. Note that the upper table of FIG. 23 shows values obtained in a case where no digital γ processing is carried out (i.e., case where only the process of changing a cell thickness is carried out), and the lower table of FIG. 23 shows values obtained in a case where the digital γ processing is carried out. The "λ=670 nm optimum" row of the lower table of FIG. 23 shows simulation values for the liquid crystal display device of the present embodiment. Note that, in an actual liquid crystal display device, light focusing power of a backlight and polarization plates affect these simulation values.

As is clear from FIG. 23, in the liquid crystal display device of the present embodiment (λ=670 nm optimum), luminance of W (white) obtained by mixing R, G, and B and transmittance are improved as compared to the conventional example (B optimum). That is, it has been confirmed that an overall transmittance can be made higher in a case where a cell thickness is determined on the basis of the wavelength 670 nm which is longer than the wavelength of blue, as compared to a case where a cell thickness is determined on the basis of blue which has the shortest wavelength.

As described above, in the liquid crystal display device of the present embodiment, a cell thickness is determined on the basis of a retardation value which is based not on blue light which has the shortest wavelength among R, G, and B, but on light having the wavelength longer than the wavelength of red light. This allows not only an improvement in transmittance of pixels of red which has a wavelength close to this wavelength, but also an improvement in overall transmittance of an image displayed by a combination of R, G, and B.

Further, in a case where a cell thickness is determined on the basis of light having the wavelength longer than the wavelength of red, the cell thickness can be made larger as compared with a case where the cell thickness is determined on the basis of blue or green. This produces an effect of improvement in durability of a liquid crystal display panel against mixing in of a foreign substance such as dust.

Further, it is possible to prevent occurrence of grayscale inversion in blue and green pixels by carrying out gradation value shifting processing of shifting input gradation values into lower gradation values with respect to image data supplied to the pixels of R, G, and B each of which has shorter wavelength than the wavelength based on which a cell thickness is determined. This allows an improvement in quality of a displayed image.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

Use of the liquid crystal display device of the present invention allows an improvement in transmittance of a displayed image. The liquid crystal display device of the present invention is applicable to a color liquid crystal display device.

REFERENCE SIGNS LIST

10: Liquid crystal display device
11: Liquid crystal display panel
12: Gate driving circuit
13: Source driving circuit
14: Timing controller
15: Display control circuit (gradation conversion section)
21, 22, 23: Display data switching circuit (gradation conversion section)

24, 25, 26: Look-up table (LUT)

27: Pseudo multi-gradation circuit (pseudo multi-gradation section)

110: Liquid crystal display device

115: Display control circuit (gradation conversion section)

121, 122, 123: Display data switching circuit (gradation conversion section)

124, 125, 126: Look-up table (LUT)

127, 128: Pseudo multi-gradation circuit (pseudo multi-gradation section)

210: Liquid crystal display device

215: Display control circuit (gradation conversion section)

221, 222, 223: Display data switching circuit (gradation conversion section)

224, 225, 226: Look-up table (LUT)

227, 228, 229: Pseudo multi-gradation circuit (pseudo multi-gradation section)

d: Cell thickness (thickness of liquid crystal layer)

u: Retardation value

The invention claimed is:

1. A liquid crystal display device comprising:

a liquid crystal display panel which has pixels of different colors and which displays a color image with use of the pixels, the liquid crystal display panel including two substrates and a liquid crystal layer sandwiched between the two substrates, and the liquid crystal layer having a thickness that is determined on a basis of a retardation value which is based on light which has a wavelength larger than light having shortest wavelength among light of the different colors; and a gradation conversion section that carries out gradation value shifting processing of shifting input gradation values to lower gradation values with respect to image data supplied to pixels having a color which has a shorter wavelength than the wavelength based on which the thickness of the liquid crystal layer is determined.

2. The liquid crystal display device according to claim 1, wherein the gradation value shifting processing varies depending on the color of the pixels.

3. The liquid crystal display device according to claim 1, further comprising a pseudo multi-gradation section which carries out pseudo multi-gradation processing with respect to the image data that has been subjected to the gradation value shifting processing in the gradation conversion section.

4. The liquid crystal display device according to claim 1, wherein the gradation conversion section has a look-up table in which input gradation values are associated with output gradation values.

5. The liquid crystal display device according to claim 1, wherein:

the liquid crystal display panel is constituted by pixels of blue, green, and red, and the thickness of the liquid crystal layer is determined on a basis of a retardation value which is based on a wavelength of green light or red light.

6. The liquid crystal display device according to claim 1, wherein:

the liquid crystal display panel is constituted by pixels of blue, green, and red, and the thickness of the liquid crystal layer is determined on a basis of a retardation value which is based on a wavelength of green light.

7. The liquid crystal display device according to claim 1, wherein:

the liquid crystal display panel is constituted by pixels of blue, green, and red, and the thickness of the liquid crystal layer is determined on a basis of a retardation value which is based on a wavelength of red light or a wavelength that is longer than the wavelength of the red light.

8. A method for driving a liquid crystal display device including a liquid crystal display panel which has pixels of different colors and which displays a color image with use of the pixels, the liquid crystal display panel including two substrates and a liquid crystal layer sandwiched between the two substrates, the method comprising the steps of:

(a) determining a thickness of the liquid crystal layer on a basis of a retardation value which is based on light which has a wavelength larger than light having shortest wavelength among light of the different colors; and (b) carrying out gradation value shifting processing of shifting input gradation values to lower gradation values with respect to image data supplied to pixels having a color which has a shorter wavelength than the wavelength based on which the thickness of the liquid crystal layer is determined.

9. The method according to claim 8, wherein the gradation value shifting processing carried out in the step (b) varies depending on the color of the pixels.

10. The method according to claim 8, further comprising the step of (c) carrying out pseudo multi-gradation processing with respect to the image data that has been subjected to the gradation value shifting processing.

11. The method according to claim 8, wherein in the step (b), the gradation value shifting processing is carried out with reference to a look-up table in which the input gradation values are associated with output gradation values.

* * * * *